(12) United States Patent
Lee et al.

(10) Patent No.: US 9,577,735 B2
(45) Date of Patent: Feb. 21, 2017

(54) METHOD FOR TRANSMITTING A SIGNAL IN MULTI-ANTENNA COMMUNICATION SYSTEM

(75) Inventors: Moon Il Lee, Seoul (KR); Wook Bong Lee, Seoul (KR); Bin Chul Ihm, Seoul (KR); Hyun Soo Ko, Seoul (KR); Jae Hoon Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 1780 days.

(21) Appl. No.: 12/106,980

(22) Filed: Apr. 21, 2008

(65) Prior Publication Data

US 2008/0267318 A1 Oct. 30, 2008

Related U.S. Application Data

(60) Provisional application No. 60/912,887, filed on Apr. 19, 2007, provisional application No. 60/949,872, (Continued)

(30) Foreign Application Priority Data

Sep. 21, 2007 (KR) .................. 10-2007-0097041

(51) Int. Cl.
*H03D 3/00* (2006.01)
*H04L 27/14* (2006.01)
(Continued)

(52) U.S. Cl.
CPC .......... *H04B 7/0671* (2013.01); *H04B 7/0689* (2013.01); *H04B 7/0691* (2013.01); *H04B 7/12* (2013.01)

(58) Field of Classification Search
CPC .. H04L 5/0048; H04L 5/0023; H04L 27/2613; H04B 7/0413
(Continued)

(56) References Cited

U.S. PATENT DOCUMENTS 6,317,411 B1 * 11/2001 Whinnett et al. ............. 370/204
6,600,934 B1 * 7/2003 Yun et al. ................. 455/562.1
(Continued)

FOREIGN PATENT DOCUMENTS

CN         1723634 A     1/2006
JP         2002538661     11/2002
(Continued)

OTHER PUBLICATIONS

Mitsubishi, NTT DoCoMo, "Low cost training for transmit antenna slectionon the uplink", Oct. 2006, 3GPP RAN1#46bis, R1-062941 p. 1-10.*
(Continued)

*Primary Examiner* — Shuwang Liu
*Assistant Examiner* — Sung Ahn
(74) *Attorney, Agent, or Firm* — Lee Hong Degerman Kang Waimey

(57) ABSTRACT

A multi-input multi-output (MIMO) system considers either reliability for each antenna or a time/frequency location, and transmits a signal at an unequal ratio for each antenna according to the consideration result. The method for use in the MIMO system including multiple antennas includes processing a signal according to an unequal ratio transmission scheme employing the multiple antennas at an unequal ratio, and transmitting the processed signal via the multiple antennas.

10 Claims, 18 Drawing Sheets

Related U.S. Application Data filed on Jul. 15, 2007, provisional application No. 60/955,645, filed on Aug. 14, 2007, provisional application No. 60/956,637, filed on Aug. 17, 2007.

(51) Int. Cl.
  *H04B 7/06* (2006.01)
  *H04B 7/12* (2006.01)

(58) Field of Classification Search
  USPC .............................. 375/299, 334, 328, 304
  See application file for complete search history.

(56) References Cited

U.S. PATENT DOCUMENTS

| | | | |
|---|---|---|---|
| 6,690,665 B1* | 2/2004 | Choi et al. .................... | 370/376 |
| 7,072,324 B1* | 7/2006 | Kim et al. .................... | 370/342 |
| 7,787,567 B2* | 8/2010 | Sutskover .................... | 375/299 |
| 7,808,882 B2* | 10/2010 | Imamura ...................... | 370/206 |
| 7,848,443 B2* | 12/2010 | Pirak et al. ................... | 375/267 |
| 7,864,903 B2* | 1/2011 | Murakami et al. ........... | 375/347 |
| 2002/0061005 A1* | 5/2002 | Lee et al. ..................... | 370/342 |
| 2003/0013476 A1* | 1/2003 | Park et al. .................... | 455/522 |
| 2003/0016640 A1* | 1/2003 | Onggosanusi et al. ....... | 370/335 |
| 2003/0128658 A1 | 7/2003 | Walton et al. | |
| 2004/0082356 A1 | 4/2004 | Walton et al. | |
| 2004/0116079 A1* | 6/2004 | Kim et al. .................... | 455/103 |
| 2004/0192216 A1* | 9/2004 | Marzetta et al. ........... | 455/67.14 |
| 2005/0047517 A1* | 3/2005 | Georgios et al. ............. | 375/267 |
| 2005/0090205 A1* | 4/2005 | Catreux-Erceg et al. ...... | 455/78 |
| 2005/0181737 A1* | 8/2005 | Kobayashi et al. ............ | 455/69 |
| 2005/0195912 A1* | 9/2005 | Kim et al. .................... | 375/267 |
| 2005/0213682 A1* | 9/2005 | Han et al. ..................... | 375/267 |
| 2005/0215264 A1* | 9/2005 | Subramaniam et al. .. | 455/452.2 |
| 2006/0023624 A1* | 2/2006 | Han et al. ..................... | 370/204 |
| 2006/0093065 A1* | 5/2006 | Thomas et al. ............... | 375/299 |
| 2006/0104196 A1* | 5/2006 | Wu ........................ | H04B 7/0417 |
| | | | 370/208 |
| 2006/0189279 A1* | 8/2006 | Kobayashi et al. .......... | 455/101 |
| 2006/0274847 A1* | 12/2006 | Molisch ................... | H04B 7/02 |
| | | | 375/267 |
| 2007/0202257 A1* | 8/2007 | Sakurai ........................ | 427/258 |
| 2007/0211815 A1* | 9/2007 | Pan et al. ...................... | 375/267 |
| 2007/0298718 A1* | 12/2007 | Je et al. ........................ | 455/63.1 |
| 2008/0139153 A1* | 6/2008 | Tuo et al. .................... | 455/277.2 |
| 2008/0212538 A1* | 9/2008 | Molisch ........................ | 370/334 |
| 2008/0225993 A1* | 9/2008 | Malladi et al. ............... | 375/340 |
| 2008/0225998 A1* | 9/2008 | Fu ................................ | 375/346 |
| 2008/0232395 A1* | 9/2008 | Buckley ................ | H04L 27/261 |
| | | | 370/465 |
| 2008/0267317 A1* | 10/2008 | Malladi ............... | H04L 27/2607 |
| | | | 375/299 |

FOREIGN PATENT DOCUMENTS

| | | |
|---|---|---|
| KR | 1020030066091 | 8/2003 |
| WO | 0207373 | 1/2002 |
| WO | 2006/019253 | 2/2006 |
| WO | WO 2006/019250 | 2/2006 |

OTHER PUBLICATIONS

Huawei, "STTD With Adaptive Transmitted Power Allocation", R1-02-0711, 3GPP TSG-RAN WG1#26, May 2002.

* cited by examiner

METHOD FOR TRANSMITTING A SIGNAL IN MULTI-ANTENNA COMMUNICATION SYSTEM

CROSS-REFERENCE TO RELATED APPLICATIONS

This application claims the benefit of earlier filing date and right of priority to Korean Patent Application Serial No. 10-2007-0097041, filed on Sep. 21, 2007, and Provisional Application Nos. 60/912,887, filed Apr. 19, 2007, 60/949,872, filed Jul. 15, 2007 and 60/955,645, filed Aug. 14, 2007, 60/956,637, filed Aug. 17, 2007, the contents of which are hereby incorporated by reference herein in their entirety.

TECHNICAL FIELD

The present invention relates to a Multiple-Input and Multiple-Output (MIMO) communication system, and more particularly to a signal transmission method and an unequal ratio transmission scheme for use in the MIMO communication system.

BACKGROUND ART

FIG. 1 is a block diagram illustrating a MIMO-OFDM system employing multiple transmission/reception (Tx/Rx) antennas.

A transmission end 1000 of the MIMO-OFDM system is shown in the left of the MIMO-OFDM system of FIG. 1. In this case, if the transmission end 1000 is an entity capable of transmitting a signal, it may be any one of a Node-B or a user equipment (UE). In the transmission end 100, a channel encoder 100 attaches redundant bits to a data packet to protect information bits from a negative influence of a channel or noise. A mapper 110 converts data bit information into data symbol information. A serial-to-parallel (S/P) converter 120 converts serial data into parallel data. A MIMO encoder 130 converts data symbols into space-time signals. The multi-antenna 140 for use in the transmission end 1000 transmit the space-time signals to channels.

A reception end 1500 of the MIMO-OFDM system is shown in the right side of the MIMO-OFDM system of FIG. 1. In this case, if the reception end 1500 is an entity capable of receiving a signal, it may be any one of a Node-B or a user equipment (UE). The Rx antenna receives a signal from a channel. A MIMO decoder 160 converts the received space-time signals into the data symbols. The de-mapper converts the data symbols into information bit. The P/S converter 180 converts a parallel signal into a serial signal. The channel decoder 190 decodes a channel code, and data is estimated at 195.

In the above-mentioned MIMO-OFDM system, space-time codes have been frequently used to maximize the spatial diversity gain. Several types of space-time codes that can provide considerable performance gain according to the number of transmit antennas and/or spatial multiplexing rate are shown in the following Table 1:

TABLE 1

| space-time codes (Scheme) | Rate | # of Tx antenna |
|---|---|---|
| (1) $\frac{1}{\sqrt{2}}\begin{bmatrix} S_1 & -S_2^* \\ S_2 & S_1^* \end{bmatrix}$ or $\frac{1}{\sqrt{2}}\begin{bmatrix} S_1 & S_2 \\ -S_2^* & S_1^* \end{bmatrix}$ | 1 | 2 |
| (2) $\frac{1}{\sqrt{2}}\begin{bmatrix} S_1 \\ S_2 \end{bmatrix}$ | 2 | 2 |
| (3) $\frac{1}{\sqrt{2(1+r^2)}}\begin{bmatrix} S_1+jr\cdot S_4 & r\cdot S_2+S_3 \\ S_2-r\cdot S_3 & jr\cdot S_1+S_4 \end{bmatrix}$, $r=\sqrt{5}\pm 1/2$ | 2 | 2 |
| (4) $\frac{1}{2}\begin{bmatrix} S_1 & S_2 & S_3 & S_4 \\ S_2^* & -S_1^* & S_4^* & -S_3^* \\ S_3 & -S_4 & -S_1 & S_2 \\ S_4^* & S_3^* & -S_2^* & -S_1^* \end{bmatrix}$ | 1 | 4 |
| (5) $\frac{1}{\sqrt{2}}\begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix}$ or $\frac{1}{\sqrt{2}}\begin{bmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix}$ | 1 | 4 |
| (6) $\frac{1}{2}\begin{bmatrix} S_1 & -S_2^* & S_5 & -S_6^* \\ S_2 & S_1^* & S_6 & S_5^* \\ S_3 & -S_4^* & S_7 & -S_8^* \\ S_4 & S_3^* & S_8 & S_7^* \end{bmatrix}$ | 2 | 4 |

In the table 1, space-time codes (1), (2) and (3) are designed for 2Tx antenna system with different diversity and multiplexing tradeoff. In addition, space-time codes (4), (5) and (6) are designed for 4Tx antenna system. Rows and columns of the above-mentioned space-time codes may be differently used according to individual situations. Rows of individual space-time codes may be considered to be a space domain (i.e., transmit antenna) and columns may be considered to be a time (i.e., OFDM symbol) or a frequency domain (i.e., subcarrier) in OFDM based system.

Each space-time code of Table 1 may be represented by a Space-Time Block Code (STBC) or a Space-Frequency Block Code (SFBC). For example, the space-time code (5) of Table 1 may be represented by the following equation 1:

$$\text{Transmit antenna} \downarrow \frac{1}{\sqrt{2}} \overbrace{\begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix}}^{\text{Time}} \quad \text{[Equation 1]}$$

$$\text{Transmit antenna} \downarrow \frac{1}{\sqrt{2}} \overbrace{\begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix}}^{\text{Frequency or subcarrier}} \quad \text{[Equation 2]}$$

In Equation 1, each column of the space-time code is considered to be a time, so that it is denoted by "STBC". In Equation 2, each column of the space-time code is considered to be a frequency or a sub-carrier, so that it is denoted by "SFBC".

The above Equation 1 indicates a scheme for transmitting symbols processed by individual columns in time domain. Therefore, in a high-speed mobility channel, inter-symbol interference could be significantly increased due to channel aging between two columns in Equation 1 and that may result in severe performance degradation.

The OFDM system of the above Equation 2 selects a space-time code for each sub-carrier using similar channel characteristics between neighboring sub-carriers, and transmits symbols processed by the selected space-time code to another Tx antenna. Compared with Equation 1, the space-frequency block code (SFBC) can acquire a higher performance under a high-speed mobile environment having a rapidly-changing channel.

The STBC expression of Equation 1 and the SFBC expression of Equation 2 can be applied to all kinds of space-time codes of Table 1.

DISCLOSURE

Technical Problem

Accordingly, the present invention is directed to a signal transmission method and an unequal ratio transmission scheme for use in a MIMO communication system, that substantially obviate one or more problems due to limitations and disadvantages of the related art.

An object of the present invention is to provide a method for transmitting a signal in a MIMO communication system.

Another object of the present invention is to provide a method for transmitting a signal with unequal ratio across the transmit antennas in a MIMO system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for transmitting a signal in a Multiple-Input Multiple-Output (MIMO) system including multiple antennas comprising: processing a plurality of symbols with a space-time/frequency code combined with time/frequency switched transmit diversity; and transmitting the processed symbols via the multiple antennas at an unequal ratio of a first ratio and a second ratio in a subframe, wherein the first ratio is larger than the second ratio, the first ratio being associated with a first antenna set having a part of the multiple antennas, and the second ratio being associated with a second antenna set having another part of the multiple antennas.

In another aspect of the present invention, there is provided a method for receiving a signal in a Multi-Input Multi-Output (MIMO) system including multiple antennas comprising: receiving a plurality of symbols via the multiple antennas at an unequal ratio of a first ratio and a second ratio in a subframe, processing the plurality of symbols with a space-time/frequency code combined with time/frequency switched transmit diversity; and wherein the first ratio is larger than the second ratio, the first ratio being associated with a first antenna set having a part of the multiple antennas, and the second ratio being associated with a second antenna set having another part of the multiple antennas.

The first ratio and the second ratio may be determined by a repetition number of the space-time/frequency code in the subframe.

The repetition number of the space-time/frequency code may be fixed or changeable according to a system situation.

The first antenna set may be selected at the first ratio in the subframe and the second antenna set may be selected at the second ratio in the subframe.

Transmission (Tx) power may be allocated to the first antenna set at the first ratio in the subframe and transmission (Tx) power may be allocated to the second antenna set at the second ratio in the subframe.

The first antenna set may have higher reliability than the second antenna set.

The first antenna set may transmit more reference symbols than the second antenna set in the subframe.

Transmission (Tx) power may be allocated by using a power-scaling matrix having different power-scaling factors per the multiple antennas or the antenna set.

For OFDM symbols transmitting at least one reference symbol in the subframe, an antenna transmitting at least one reference symbol may be allocated with smaller weight than other antenna among antennas included in each antenna set.

For OFDM symbols transmitting at least one reference symbol in the subframe, at least one data symbol among the plurality of symbols may be punctured and transmission (Tx) power of reference symbol is increased by amount of transmission (Tx) power for the punctured data symbol.

The processed symbols of a specific region may be transmitted via the multiple antennas at an unequal ratio, the specific region being included among one or more regions divided from the subframe.

The one or more regions may be divided according to whether reference symbols are transmitted or not in each region.

The one or more regions may be divided according to how many antennas are associated with reference symbols transmitted in each region.

In another aspect of the present invention, there is provided a method for transmitting a signal in a Multiple-Input Multiple-Output (MIMO) system employing multiple antennas comprising: allocating power weights to a plurality of symbols per antenna; transmitting the weighted symbols via the multiple antennas in a subframe, wherein an antenna transmitting at least one reference symbol is allocated with smaller weight than other antenna among the multiple antennas for time unit transmitting at least one reference symbol in the subframe.

In another aspect of the present invention, there is provided a method for transmitting a signal in a Multiple-Input Multiple-Output (MIMO) system comprising: dividing time-frequency resources contained in a transmission (Tx) unit of the MIMO system into one or more regions; determining a signal transmission scheme for each division region; and performing signal transmission according to the determined scheme.

The division region may be determined by the presence or absence of a reference symbol.

The method may further comprise: determining the signal transmission scheme in consideration of characteristics of reference symbols contained in the division region.

If the division region includes the reference symbols, an unequal ratio transmission scheme may be applied to the division region, and if the division region includes none of the reference symbols, an equal ratio transmission scheme may be applied to the division region.

It is to be understood that both the foregoing general description and the following detailed description of the present invention are exemplary and explanatory and are intended to provide further explanation of the invention as claimed.

Advantageous Effects

The present invention provides an unequal ratio transmission scheme of space-time codes. Although multiple antennas have different reliabilities, the unequal ratio transmission scheme can increase the Rx performance irrespective of the Doppler frequency in the spatial channel. And, the unequal ratio transmission scheme can solve the physical-antenna unequal power transmission problem caused by reference symbols.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
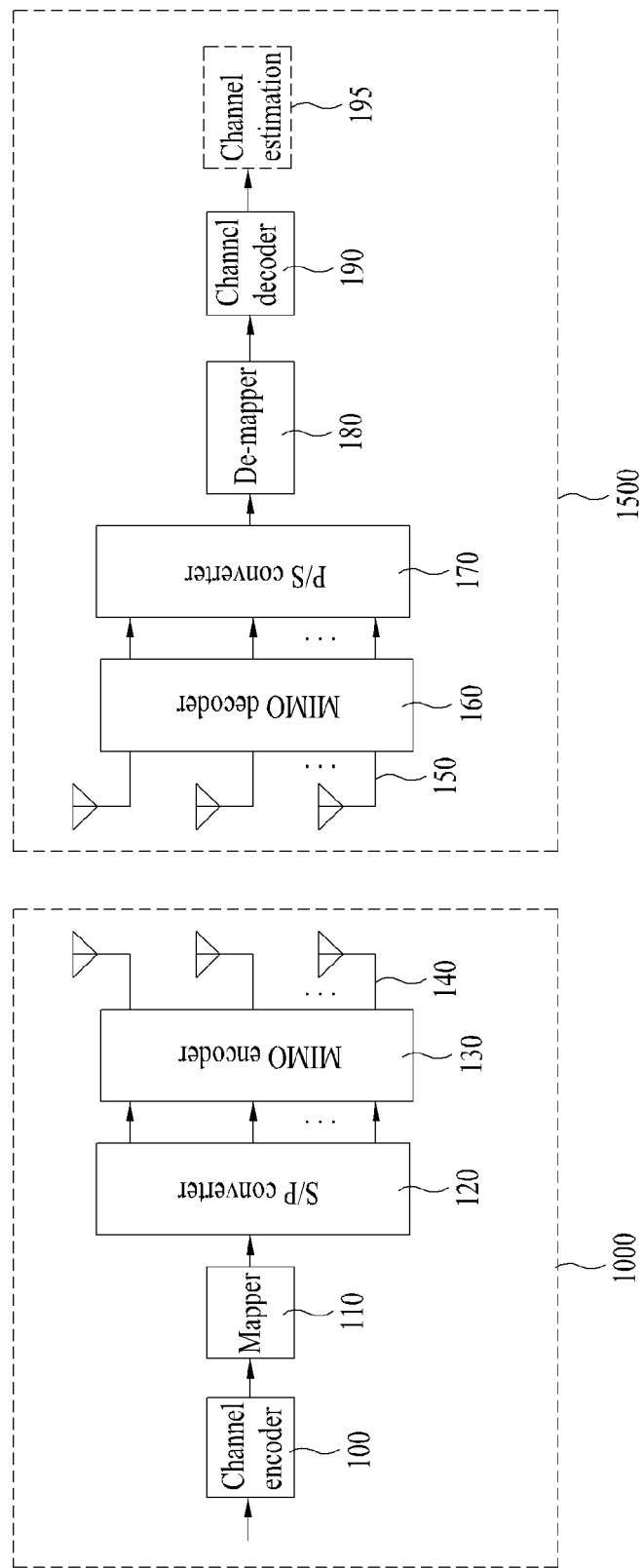
FIG. 1 is a block diagram illustrating a MIMO-OFDM system equipped with multiple transmission/reception (Tx/Rx) antennas.

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart. Wherever possible, the same reference numbers will be used throughout the drawings to refer to the same or like parts.

A general Multiple-Input Multiple-Output (MIMO) scheme has been designed on the assumption that all Tx antennas have the same reliability. However, the actually-implemented system may have different channel estimation performances according to reference symbol quantities of individual Tx antennas. In other words, Tx antennas may have different signal detection performances. Therefore, the above-mentioned MIMO schemes must be changed to others on the condition that the individual Tx antennas have different signal detection performances.

And, when a reference symbol of a corresponding channel is transmitted according to characteristics of either a communication system or a communication channel, higher Tx power can be used as compared to transmission of a general data signal. Namely, there may arise a difference in Tx-power allocation for each-Tx antenna. The above-mentioned reference symbols may also be called other names, (e.g., reference signals (RSs), pilot symbols or pilot signals) according to the system.

A space-time code combined with unequal ratio transmission according to the present invention enables the MIMO system to use individual Tx antennas at an unequal ratio using space-time codes. In the case of using the space-time code combined with unequal ratio transmission scheme, provided that individual antennas have different reliabilities, the Rx performance can be improved irrespective of the Doppler frequency. And, the physical-antenna unequal power transmission problem caused by the reference symbol can be solved.

In general, the unequal ratio transmission scheme can be combined with space-time codes in two different manners such as an antenna switching scheme and a Tx-power scaling for each Tx antenna. Needless to say, the first method and the second method may also be combined with each other as necessary.

<First Embodiment>

Space-Time Code Combined with Unequal Ratio Transmission Scheme Based on Antenna Switching Scheme Prior to describing this embodiment of the present invention, a space-time code for use in a multi-antenna encoding method (also called a MIMO encoding method) or a spatial processing method, and a MIMO scheme (i.e., an antenna-switching scheme) based on the above-mentioned space-time code will hereinafter be described.

The space-time code (1) shown in Table 1 has a spatial multiplexing rate of 1, and the space-time code (3) shown in Table 1 has a spatial multiplexing rate of 2, such that the space-time codes (1) and (3) can acquire the highest diversity gains, respectively among the space-time codes for 2 Tx antennas shown in Table 1.

If the number of Tx antennas is more than "2", the space-time codes (1) and (3) of Table 1 may be combined with the antenna switching scheme as necessary. Equation 1 and Equation 2 can be explained to show an example of the above combination. As can be seen from Equations 1 and 2, if the space-time code for 2 Tx antennas is combined with the antenna-switching scheme, the signal is transmitted to individual antennas the same number of times, resulting in the implementation of the highest diversity gain.

A method for applying the above antenna-switching scheme using the space-time code will hereinafter be described.

$$\text{Antenna} \downarrow \frac{1}{\sqrt{2}} \overbrace{\begin{bmatrix} S_1 & 0 & 0 & 0 \\ 0 & S_2 & 0 & 0 \\ 0 & 0 & S_3 & 0 \\ 0 & 0 & 0 & S_4 \end{bmatrix}}^{\text{Time}} \quad \text{[Equation 3]}$$

$$\text{Antenna} \downarrow \frac{1}{\sqrt{2}} \overbrace{\begin{bmatrix} S_1 & 0 & 0 & S_7 \\ S_2 & 0 & S_5 & 0 \\ 0 & S_3 & S_6 & 0 \\ 0 & S_4 & 0 & S_8 \end{bmatrix}}^{\text{Time}} \quad \text{[Equation 4]}$$

As can be seen from Equation 3, a single Tx antenna for each time is selected in a communication system equipped with 4 Tx antennas, and is then transmitted. Namely, Equation 3 may be considered to be the case indicated by the spatial multiplexing rate of 1.

As can be seen from Equation 4, 2 Tx antennas for each time are selected in a communication system equipped with 4 Tx antennas, and are then transmitted. Namely, Equation 4 may be considered to be the case indicated by the spatial multiplexing rate of 2.

Also, Equation 3 and Equation 4 represent to select Tx antenna(s) using a predetermined pattern for each time according to the above-mentioned TSTD method, and transmit data, thereby acquiring a spatial diversity gain.

If the scheme of Equation 3 is extended to the sub-carrier region in the OFDM system, the following equation 5 can be acquired. If the scheme of Equation 4 is extended to the sub-carrier region in the OFDM system, the following equation 6 can be acquired.

$$\text{Antenna} \downarrow \frac{1}{\sqrt{2}} \overbrace{\begin{bmatrix} S_1 & 0 & 0 & 0 \\ 0 & S_2 & 0 & 0 \\ 0 & 0 & S_3 & 0 \\ 0 & 0 & 0 & S_4 \end{bmatrix}}^{\text{Subcarrier}} \quad \text{[Equation 5]}$$

$$\text{Antenna} \downarrow \frac{1}{\sqrt{2}} \overbrace{\begin{bmatrix} S_1 & 0 & 0 & S_7 \\ S_2 & 0 & S_5 & 0 \\ 0 & S_3 & S_6 & 0 \\ 0 & S_4 & 0 & S_8 \end{bmatrix}}^{\text{Subcarrier}} \quad \text{[Equation 6]}$$

As can be seen from Equation 5, a single Tx antenna for each sub-carrier is selected in a communication system equipped with 4 Tx antennas, and is then transmitted. Namely, Equation 5 may be considered to be the case indicated by the spatial multiplexing rate of 1.

As can be seen from Equation 6, 2 Tx antennas for each sub-carrier are selected in a communication system equipped with 4 Tx antennas, and are then transmitted. Namely, Equation 6 may be considered to be the case indicated by the spatial multiplexing rate of 2.

Also, Equation 5 and Equation 6 represent to select Tx antenna(s) using a predetermined pattern for each frequency or subcarrier according to the above-mentioned FSTD method, and transmit data, thereby acquiring a spatial diversity gain.

Equations 3 to 6 show examples of TSTD and FSTD schemes. The schemes of Equations 3 to 6 are continuously repeated by at least two any columns, so that it can be recognized that all antennas will transmit signals at the same ratio. This scheme can be called a space-time code equal ratio transmission scheme.

Figure 2:
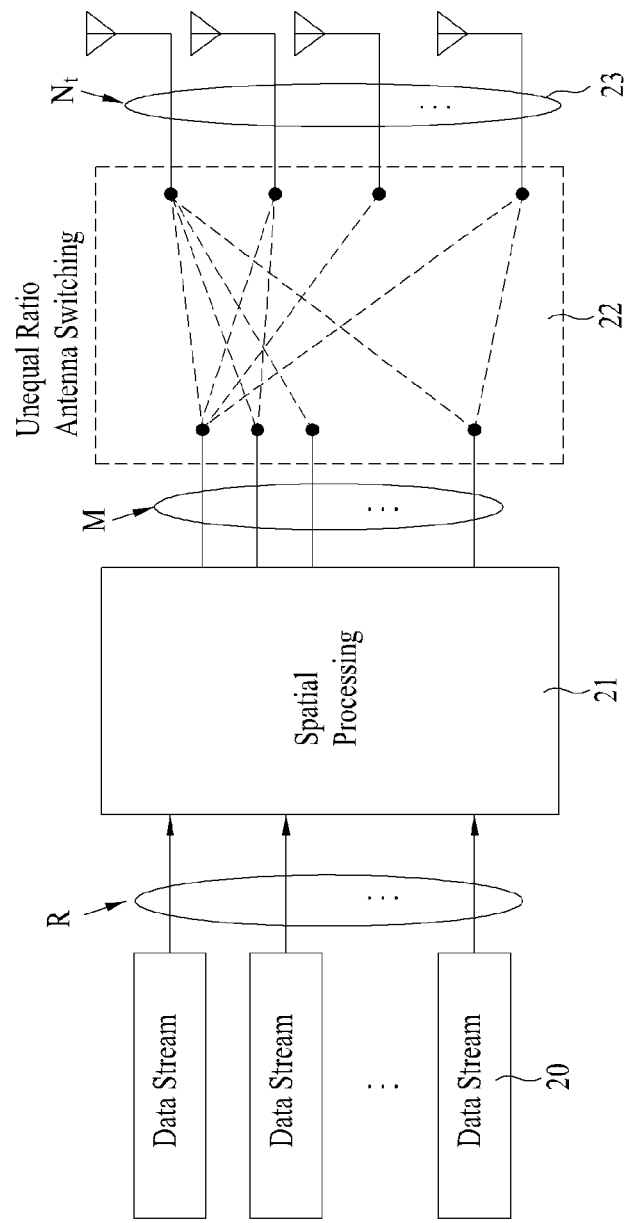
FIG. 2 is a block diagram illustrating an exemplary transmission system for use in an unequal ratio transmission scheme of space-time codes based on an antenna switching technique according to the present invention.

FIG. 2 is a block diagram illustrating an exemplary transmission system for use in an unequal ratio transmission scheme of space-time codes based on an antenna switching technique according to the present invention.

FIG. 2 shows an example of a transmission end of a communication system. The transmission end of FIG. 2 may be similar to that of FIG. 1. The transmission end of FIG. 2 will hereinafter be described on the basis of only characteristic constitutions of the present invention.

Referring to FIG. 2, the transmission end of the communication system includes a spatial processing block 21, and may additionally include an unequal ratio antenna switching unit 22. In this case, the spatial processing block 21 may be replaced with the MIMO encoder of FIG. 1.

If R data streams 20 are applied to the spatial processing block 21, they are spatially-processed by the spatial processing block 21, so that they are converted into M signals. M signals are applied to the unequal ratio antenna switching unit 22, so that they are transmitted to the reception end via $N_t$ Tx antennas 23 by the space-time code combined with unequal ratio transmission scheme. Namely, "R" is indicative of a spatial multiplexing rate, "M" is indicative of the spatial-multiplexed result, and "$N_t$" is the number of Tx antennas.

All the above-mentioned spatial processing methods can be applied to the spatial processing block 21 of FIG. 2. The above-mentioned unequal ratio antenna switching unit 22 transmits the signal, which has been spatially processed at an appropriate ratio for each Tx antenna, so that it serves as an unequal ratio transmitter.

The antenna switching scheme selects $N_s$ Tx antennas from among $N_t$ Tx antennas in either a specific time domain or a specific frequency domain, and transmits data using the selected antennas. In this case, "$N_s$" and "$N_t$" may satisfy the following equation 7:

$$N_s \leq N_t \qquad [\text{Equation 7}]$$

In the above-mentioned antenna switching scheme, a scheme for switching a specific antenna in time is called a Time-Switched Transmit Diversity (TSTD) scheme, and another scheme for switching a specific antenna according to a frequency domain is called a Frequency-Switched Transmit Diversity (FSTD) scheme.

Needless to say, the antenna switching unit 22 based on the antenna switching scheme may be separated from the spatial processing block 21 as shown in FIG. 2. If required, the spatial processing block 21 may also be designed to perform the above antenna switching using the space-time code capable of being replaced with the above-mentioned antenna switching unit 22.

The unequal ratio transmission scheme according to the present invention will hereinafter be described with reference to the following space-time code. The following equation 8 shows an exemplary space-time code to which the unequal ratio transmission scheme can be applied.

$$\text{Antenna} \Biggl\downarrow \overbrace{\begin{bmatrix} S_1 & 0 & 0 & S_4 & 0 & 0 \\ 0 & S_2 & 0 & 0 & S_5 & 0 \\ 0 & 0 & S_3 & 0 & 0 & 0 \\ 0 & 0 & 0 & 0 & 0 & S_6 \end{bmatrix}}^{\text{Time or Subcarrier}} \qquad [\text{Equation 8}]$$

Equation 8 exemplarily shows an application of a TSTD/FDTD scheme having the spatial multiplexing rate of 1 in a system equipped with 4 Tx antennas. As can be seen from Equation 8, a single symbol contained in either a single timeslot or a single sub-carrier is selected by a single Tx antenna from among 4 Tx antennas, and is then transmitted.

If the above-mentioned pattern is continuously repeated and transmitted to a time domain or a frequency domain, it can be considered that the number of data symbols transmitted to first and second antennas is double that of other data symbols transmitted to third and fourth antennas.

In the case of Equation 8, if the reliability of the first and second Tx antennas is higher than that of the third and fourth Tx antennas, a performance gain can be achieved. If reference symbols of the third and fourth Tx antennas are applied to a specific OFDM symbol, Equation 8 may be adapted to adjust power values of individual physical antennas to be equal to each other. Another example in which many more data symbols are transmitted to the first and second Tx antennas is shown in the following equation 9:

$$\text{Antenna} \Biggl\downarrow \overbrace{\begin{bmatrix} S_1 & 0 & S_3 & 0 & 0 & S_6 & 0 & S_8 & 0 & 0 \\ 0 & S_2 & 0 & S_4 & 0 & 0 & S_7 & 0 & S_9 & 0 \\ 0 & 0 & 0 & 0 & S_5 & 0 & 0 & 0 & 0 & 0 \\ 0 & 0 & 0 & 0 & 0 & 0 & 0 & 0 & 0 & S_{10} \end{bmatrix}}^{\text{Time or Subcarrier}} \qquad [\text{Equation 9}]$$

In Equation 9, the ratio of data symbols transmitted to the first and second Tx antennas is higher than that of other data symbols transmitted to the third and fourth Tx antennas by three times. Therefore, compared with Equation 8, Equation 9 relatively increased the ratio of data symbols transmitted to the first and second Tx antennas. The above-mentioned method can be easily implemented although the spatial multiplexing rate increases.

If the system equipped with 4 Tx antennas applies the space-time code (1) of Table 1 to the above-mentioned spatial processing block, the following result is made, as shown in Equation 10.

[Equation 10]

$$\text{Antenna} \begin{bmatrix} S_1 & -S_2^* & S_3 & -S_4^* & 0 & 0 & S_7 & -S_8^* & 0 & 0 \\ S_2 & S_1^* & 0 & 0 & S_5 & -S_6^* & 0 & 0 & S_9 & -S_{10}^* \\ 0 & 0 & S_4 & S_3^* & 0 & 0 & 0 & 0 & S_{10} & S_9^* \\ 0 & 0 & 0 & 0 & S_6 & S_5^* & S_8 & S_7^* & 0 & 0 \end{bmatrix} \xrightarrow{\text{Time or Subcarrier}}$$

(2 cycle, 1 cycle, 3 cycle, 5 cycle)

In Equation 10, the switching ratio of Tx signals of the first and second Tx antennas is higher than of other Tx signals transmitted to the third and fourth Tx antennas and the ratio can be different according to the cycles.

If 10 columns contained 5 cycles shown in Equation 10 are used as a single pattern, a signal transmission ratio of the first/second Tx antenna (hereinafter referred to as (1,2) Tx-antenna) and the third/fourth Tx antenna (hereinafter referred to as (3,4) Tx-antenna) is represented by 3:2.

And, if 6 columns contained in 3 cycles shown in Equation 10 are used as a single pattern, the above-mentioned signal transmission ratio is represented by 2:1.

For example, in the case of a specific system in which a difference in reliability between the (1,2) Tx-antenna and the (3,4) Tx-antenna increases in proportion to an increasing UE's moving speed, a cycle may be changed to another cycle according to situations, and the changed cycle is used as a single pattern, so that the system performance can be optimized.

Further, as above description referring to Equations 3 to 6 if (1,2) Tx-antenna and the (3,4) Tx-antenna are used by turns for TSTD or FSTD, a signal transmission ratio of (1,2) Tx-antenna and the (3,4) Tx-antenna may be changed according to a repetition number of the space-time/frequency code in the subframe. For example, if the repetition number of the space-time/frequency code in the subframe is odd, signal transmission ratio of (1,2) Tx-antenna is larger than that of the (3,4) Tx-antenna.

In another embodiment of the present invention, unequal space-time signals shown in Equations 11-13 can be transmitted as necessary.

[Equation 11]

$$\text{Antenna} \begin{bmatrix} 0 & 0 & 0 & 0 & S_5 & S_6 & 0 & 0 \\ 0 & 0 & 0 & 0 & 0 & 0 & S_7 & S_8 \\ S_1 & S_2 & S_3 & S_4 & -S_6^* & S_5^* & 0 & 0 \\ -S_2^* & S_1^* & -S_4^* & S_3^* & 0 & 0 & -S_8^* & S_7^* \end{bmatrix} \xrightarrow{\text{Frequency}}$$

[Equation 12]

$$\text{Antenna} \begin{bmatrix} 0 & 0 & 0 & 0 & 0 & 0 & S_7 & -S_8^* \\ 0 & 0 & 0 & 0 & 0 & 0 & S_8 & S_7^* \\ S_1 & -S_2^* & S_3 & -S_4^* & S_5 & -S_6^* & 0 & 0 \\ S_2 & S_1^* & S_4 & S_3^* & S_6 & S_5^* & 0 & 0 \end{bmatrix} \xrightarrow{\text{Frequency}}$$

[Equation 13]

$$\text{Antenna} \begin{bmatrix} S_1 & S_2 & 0 & 0 & 0 & 0 & 0 & 0 \\ 0 & 0 & S_3 & S_4 & 0 & 0 & 0 & 0 \\ -S_2^* & S_1^* & 0 & 0 & S_5 & S_6 & S_7 & S_8 \\ 0 & 0 & -S_4^* & S_3^* & -S_6^* & S_5^* & -S_8^* & S_7^* \end{bmatrix} \xrightarrow{\text{Frequency}}$$

If the order of transmission of the space-time codes of Equations 11 to 13 is a single cycle, the signal transmission ratio of the (1,2) Tx-antenna and the (3,4) Tx-antenna is represented by 1:3.

As can be seen from Equation 8 to 13, provided that the transmission ratio according to the unequal ratio transmission scheme is maintained on the condition that the orthogonality of space-time codes is maintained, all kinds of transmission schemes can be made available.

<Second Embodiment>

Figure 3:
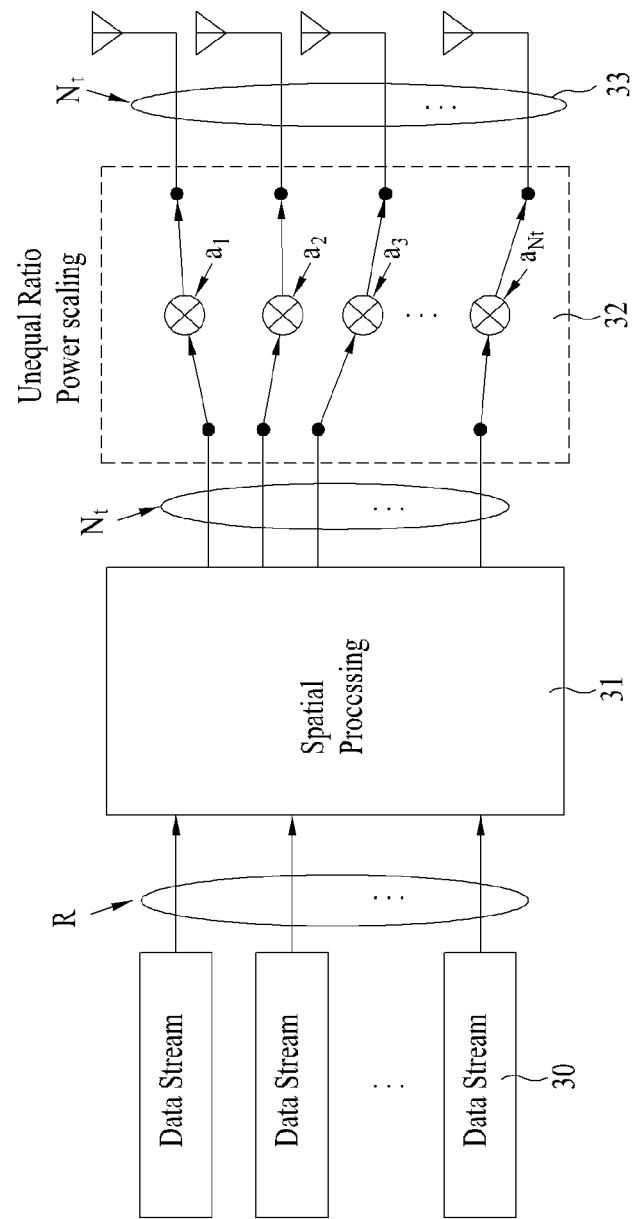
FIG. 3 is a block diagram illustrating an exemplary transmission system for use in an unequal ratio transmission scheme of space-time codes based on a Tx-power scaling technique according to the present invention.

Space-Time Code Combined with Unequal Ratio Transmission Scheme Based on Power Scaling Scheme FIG. 3 is a block diagram illustrating an exemplary transmission system for use in an unequal ratio transmission scheme of space-time codes based on a Tx power scaling scheme according to the present invention.

FIG. 3 shows an example of a transmission end of a communication system. The transmission end of FIG. 3 may be similar to that of FIG. 1. The transmission end of FIG. 3 will hereinafter be described on the basis of only characteristic constitutions of the present invention.

Referring to FIG. 3, the transmission end of the communication system includes a spatial processing block 31, and may additionally include an unequal ratio power-scaling unit 32. In this case, the spatial processing block 21 may be replaced with the MIMO encoder of FIG. 1.

If R data streams 30 are applied to the spatial processing block 31, they are spatially-processed by the spatial processing block 31, so that they are converted into M signals. M signals are applied to the unequal ratio power-scaling unit 32, so that they are transmitted to the reception end via $N_t$ number of Tx antennas 33 by the space-time-code unequal ratio transmission scheme. Namely, "R" is indicative of a spatial multiplexing rate, "M" is indicative of the spatial-multiplexed result, and "$N_t$" is the number of Tx antennas.

All the above-mentioned spatial processing methods can be applied to the spatial processing block 31 of FIG. 3. The above-mentioned unequal ratio power-scaling unit 32 transmits the signal, which has been spatially processed at an appropriate power ratio for each Tx antenna, so that it serves as an unequal ratio transmitter. For example, if individual Tx antennas have different reliabilities, a low-reliability Tx antenna may be reduced and then transmitted.

Operations of the unequal ratio power-scaling unit 32 will be described in more detail. As can be seen from FIG. 3, the unequal ratio power-scaling unit 32 receives output signals of the spatial processing block 31, and weights the received signals using a power factor $a_i$, i=1, 2, ..., $N_t$, decided by reliability of each Tx antenna, so that it can adjust a Tx power of each antenna. In this case, it is preferable that the power of reference symbols of all Tx antennas may not be adjusted by the aforementioned power factor so as to prevent the channel estimation performance from being deteriorated.

Preferably, the power factor for each Tx antenna may be set to a specific power factor at which Tx power of all antennas is equal to or less than the highest Tx power.

$$|a_1|^2 + |a_2|^2 + |a_3|^2 + |a_4|^2 = K \qquad \text{[Equation 14]}$$

Under the above-mentioned condition, i.e., if the power value for each Tx antenna is set to a specific power value at which Tx power of all antennas is equal to or less than the highest Tx power, Equation 14 shows an example of a reference value which must be satisfied by the power factor capable of determining the power for each Tx antenna. Particularly, Equation 14 shows applicable examples in the case of using 4 Tx antennas.

In Equation 14, "K" is a factor for normalizing a total of Tx power of the transmitter. In Equation 14, $a_i$, i=1, 2, ..., 4 is a real number, and serves as a power factor for adjusting a power of i-th Tx antenna. In one example of the above-mentioned scheme, if the reliability of the (1,2) Tx-antennas is higher than that of the (3,4) Tx-antennas, the power can be adjusted in the form of the following equation 15:

$$(|a_1|^2 = |a_2|^2) \geq (|a_3|^2 = |a_4|^2) \quad \text{[Equation 15]}$$

Equation 15 shows a method for adjusting the power and employing the adjusted power on the condition that the reliability of the (1, 2) Tx-antennas is higher than that of the (3, 4) Tx-antennas. In the same manner as in Equation 14, $a_i$, i=1, 2, ..., 4 is a real number, and serves as a power factor for adjusting a power of i-th Tx antenna. And, the power factor value can be determined within the range in which the power factor's condition disclosed in the above Equation 14 is satisfied.

An unequal ratio transmission scheme according to the present invention will hereinafter be described with reference to space-time codes. The above-mentioned space-time code combined with unequal ratio transmission scheme based on the above-mentioned Tx-power scaling scheme can be applied to other spatial processing methods. Exemplary space-time codes for use in the unequal ratio transmission scheme are shown in the following equation 16:

$$\text{Antenna} \Biggl\downarrow \frac{1}{\sqrt{2}} \begin{bmatrix} a_1 & 0 & 0 & 0 \\ 0 & a_2 & 0 & 0 \\ 0 & 0 & a_3 & 0 \\ 0 & 0 & 0 & a_4 \end{bmatrix} \begin{bmatrix} S_1 & -S_2^* & 0 & 0 \\ S_2 & S_1^* & 0 & 0 \\ 0 & 0 & S_3 & -S_4^* \\ 0 & 0 & S_4 & S_3^* \end{bmatrix} \overset{\text{Time or Subcarrier}}{\longrightarrow} \quad \text{[Equation 16]}$$

Space-time codes of Equation 16 can be modified into others, and the following equation 17 shows additional examples:

$$\text{Antenna} \Biggl\downarrow \frac{1}{\sqrt{2}} \begin{bmatrix} a_1 & 0 & 0 & 0 \\ 0 & a_2 & 0 & 0 \\ 0 & 0 & a_3 & 0 \\ 0 & 0 & 0 & a_4 \end{bmatrix} \begin{bmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix} \overset{\text{Time or Subcarrier}}{\longrightarrow} \quad \text{[Equation 17]}$$

Equation 16 shows that the unequal ratio transmission scheme is applied to an example of the above-mentioned Equations 1 and 2. Equation 17 shows that the unequal ratio transmission scheme is applied to one example in which Tx antenna and transmission order are modified by Equations 1 and 2. In this case, a diagonal matrix comprised of $a_i$, i=1, 2, ..., 4 may be referred to as a power-scaling matrix. As depicted in Equation 16, the power-scaling matrix is multiplied by various space-time codes, so that the power-scaling can be easily conducted.

Each of the following equations 18 and 19 indicates another example of the space-time code to which the unequal ratio transmission scheme can be applied.

$$\text{Antenna} \Biggl\downarrow \frac{1}{\sqrt{2}} \begin{bmatrix} a_1 & 0 & 0 & 0 \\ 0 & a_2 & 0 & 0 \\ 0 & 0 & a_3 & 0 \\ 0 & 0 & 0 & a_4 \end{bmatrix} \begin{bmatrix} S_1 & 0 & 0 & 0 \\ 0 & S_2 & 0 & 0 \\ 0 & 0 & S_3 & 0 \\ 0 & 0 & 0 & S_4 \end{bmatrix} \overset{\text{Time or Subcarrier}}{\longrightarrow} \quad \text{[Equation 18]}$$

$$\text{Antenna} \Biggl\downarrow \frac{1}{\sqrt{2}} \begin{bmatrix} a_1 & 0 & 0 & 0 \\ 0 & a_2 & 0 & 0 \\ 0 & 0 & a_3 & 0 \\ 0 & 0 & 0 & a_4 \end{bmatrix} \begin{bmatrix} S_1 & 0 & 0 & S_7 \\ S_2 & 0 & S_5 & 0 \\ 0 & S_3 & S_6 & 0 \\ 0 & S_4 & 0 & S_8 \end{bmatrix} \overset{\text{Time or Subcarrier}}{\longrightarrow} \quad \text{[Equation 19]}$$

Equation 18 shows that the unequal ratio transmission scheme is applied to Equations 3 and 5. Equation 19 shows that the unequal ratio transmission scheme is applied to an example of Equations 4 and 6.

As can be seen from Equation 18, a single Tx antenna for each time is selected in a communication system equipped with 4 Tx antennas, and is then transmitted. Namely, Equation 18 may be considered to be the case indicated by the spatial multiplexing rate of 1.

As can be seen from Equation 19, 2 Tx antennas for each time are selected in a communication system equipped with 4 Tx antennas, and are then transmitted. Namely, Equation 19 may be considered to be the case indicated by the spatial multiplexing rate of 2.

<Third Embodiment>

Figure 4:
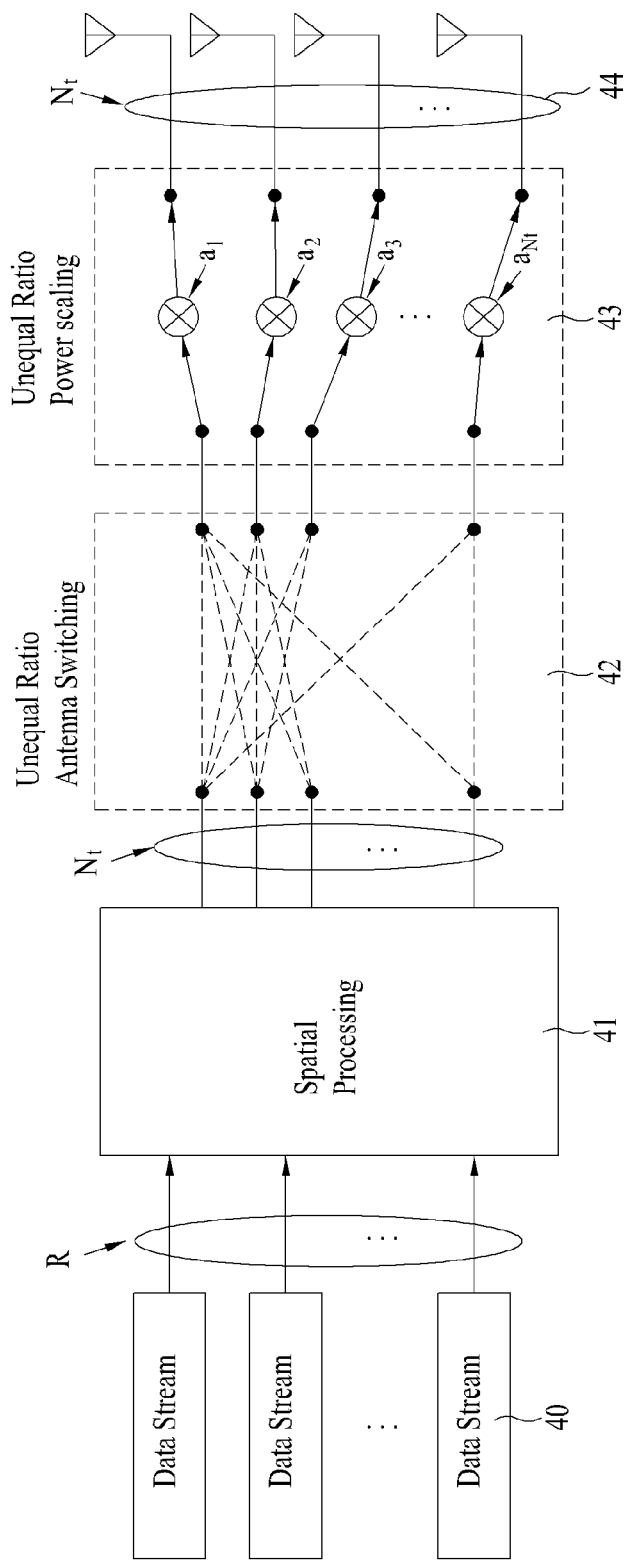
FIG. 4 is a block diagram illustrating an exemplary transmission system to which a first space-time-code unequal ratio transmission scheme based on an antenna switching scheme and a second space-time-code unequal ratio transmission scheme based on a Tx-power scaling for each Tx-antenna are simultaneously applied.

Space-Time Code Combined with Unequal Ratio Transmission Scheme Based on Antenna-Switching and Tx-Power Scaling for Each Tx-Antenna FIG. 4 is a block diagram illustrating an exemplary transmission system to which a space-time-code unequal ratio transmission scheme based on an antenna switching scheme and a Tx-power scaling for each Tx-antenna.

As previously stated above, the space-time-code unequal ratio transmission scheme may be implemented with different ways, i.e., a first method based on the antenna switching and a second method based on the Tx-power scaling for each Tx-antenna. If required, the first method and the second method may be combined with each other. FIG. 4 exemplarily shows the combination of the first and second methods. Constitutions and operations of FIG. 4 are equal or similar to those of FIGS. 2 and 3.

<Fourth Embodiment>

Space-Time Code Combined with Unequal Ratio Transmission Scheme for a System to Which Generalized Phase Shift Diversity Scheme and/or Generalized Cyclic Delay Diversity Scheme are(is) Applied <Generalized Phase Shift Diversity Scheme>

Prior to describing this embodiment of the present invention, a generalized phase shift diversity (GPSD) scheme as an exemplary MIMO scheme will hereinafter be described in detail.

Figure 5:
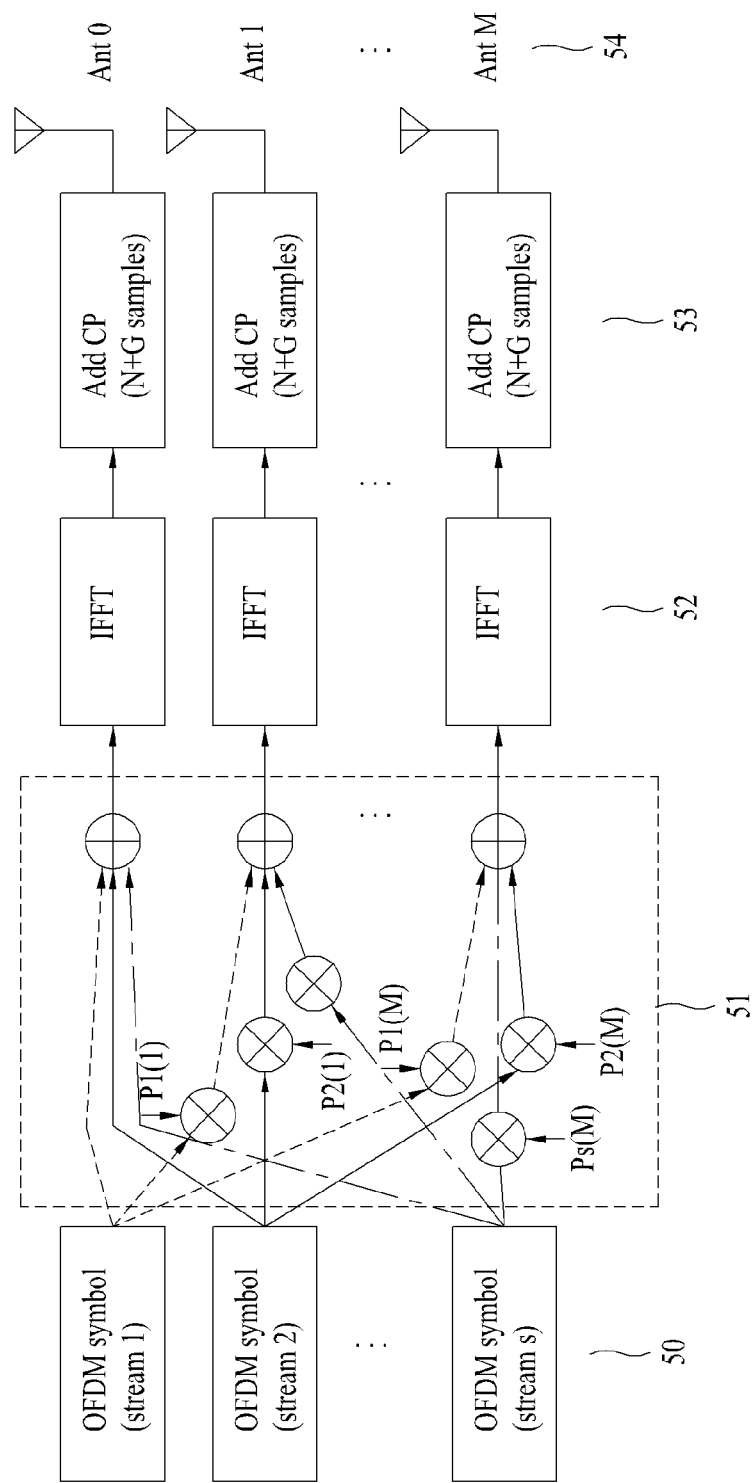
FIG. 5 is a transmission-end's block diagram illustrating an example of a generalized phase-shift diversity scheme available for an OFDM system according to one embodiment of the present invention.

FIG. 5 is a block diagram of a transmission-end illustrating an example of a generalized phase-shift diversity scheme available for an OFDM system according to one embodiment of the present invention.

The GPSD method of FIG. 5 can acquire a diversity gain and a beamforming (BF) gain, irrespective of the spatial multiplexing rate and the number of Tx antennas.

Transmission (Tx) data is divided into several data units so that it can be transmitted/received to/from the OFDM system. In other words, as shown in FIG. 5, Tx data may include at least one OFDM symbol 50 or at least one stream. Each OFDM symbol 50 is received in the spatial processing block 51. The spatial processing block 51 performs spatial-processing on the received OFDM symbol 50.

In this case, the spatial processing block 51 may process each OFDM symbol 50 according to the GPSD scheme. In other words, a phase-shift value for each Tx antenna is applied to each OFDM symbol 50, so that the space-time-processed signal for each Tx antenna is configured. Detailed descriptions of the GPSD scheme will be described with reference to the space-time code.

The signals spatially-processed by the spatial processing block 51 are converted into time-domain signals by the IFFT module 52 for each Tx antenna. A Cyclic Prefix (CP) is attached to the time-domain signals generated from the IFFT module 52, so that the inter-symbol interference problem can be solved by the CP-adder 53 for each Tx antenna, resulting in the prevention of inter-channel interference. The final resultant signals are transmitted to the reception end via individual Tx antennas 54.

The GPSD technique of FIG. 5 can be represented by the following equation 20:

$$GPSD_{N_t \times R}^k = \begin{pmatrix} w_{1,1}^k & w_{1,2}^k & \cdots & w_{1,R}^k \\ w_{2,1}^k & w_{2,2}^k & \cdots & w_{2,r}^k \\ \vdots & \vdots & \ddots & \vdots \\ w_{N_t,1}^k & w_{N_t,2}^k & \cdots & w_{N_t,R}^k \end{pmatrix} \quad \text{[Equation 20]}$$

In Equation 20, $GPSD_{N_t \times R}^k$ is a preceding matrix to which a generalized phase shift diversity (GPSD) scheme can be applied. $w_{i,j}^k$, i=1, ..., $N_t$, j=1, ..., R is a complex weight, and "k" is a resource index or a sub-carrier index.

Therefore, the complex weight $w_{i,j}^k$ may have different values according to either a data symbol multiplied by antennas or a sub-carrier index. Preferably, the preceding matrix of Equation 20 is configured in the form of a unitary matrix to reduce a loss of channel capacity in a MIMO system.

The following equation 21 represents channel capacity of the open-loop MIMO system:

$$C_u(H) = \log_2\left(\det\left(I_{N_r} + \frac{SNR}{N} HH^H\right)\right) \quad \text{[Equation 21]}$$

In Equation 21, H is a ($N_r \times N_t$)-sized MIMO channel. In this case, $N_t$ is the number of Tx antennas and $N_r$ is the number of Rx antennas. If the preceding matrix (P) is applied to Equation 21, the following equation 22 is made:

$$C_{precoding} = \log_2\left(\det\left(I_{N_r} + \frac{SNR}{N} HPP^H H^H\right)\right) \quad \text{[Equation 22]}$$

In Equation 22, P is a preceding matrix. As can be seen from Equation 22, in order to remove the loss of channel capacity, the preceding matrix P must satisfy the following equation 23 indicating the unitary matrix condition.

$$PP^H = I_{N_t} \quad \text{[Equation 23]}$$

Equation 23 shows an example of the above-mentioned unitary matrix condition. The $GPSD_{N_t \times R}^k$ matrix, which has satisfied the unitary matrix condition, can be easily implemented by combination of various unitary matrixes.

The $GPSD_{N_t \times R}^k$ matrix, which is configured in the form of a product of a phase-shift matrix and a unitary matrix, which have the same resource index k, is exemplarily shown in the following equation 24:

$$GPSD_{N_t \times R}^k = \begin{pmatrix} w_{1,1}^k & w_{1,2}^k & \cdots & w_{1,R}^k \\ w_{2,1}^k & w_{2,2}^k & \cdots & w_{2,R}^k \\ \vdots & \vdots & \ddots & \vdots \\ w_{N_t,1}^k & w_{N_t,2}^k & \cdots & w_{N_t,R}^k \end{pmatrix} \quad \text{[Equation 24]}$$

$$= \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_{N_t} k} \end{pmatrix} (U_{N_t \times R}^k)$$

In Equation 24, a phase angle $\theta_i(t)$, i=1, ..., $N_t$ corresponding to an index contained in the phase-shift matrix can be calculated by the following equation 25 according to a delay value $\tau_i(t)$, i=1, ..., $N_t$. $U_{N_t \times R}^k$ may be a unitary matrix specified for the index k, or may also be fixed irrespective of the index k.

$$\theta_i = \frac{-2\pi}{N} \cdot \tau_i \quad \text{[Equation 25]}$$

In Equation 25, "N" is the number of all resources or all resource blocks, or is the number of sub-carriers of an OFDM symbol. As described above, $\tau_i(t)$, i=1, ..., $N_t$ is a delay value.

The following equation 26 shows another example of the $GPSD_{N_t \times R}^k$ matrix.

$$GPSD_{N_t \times R}^k = \begin{pmatrix} w_{1,1}^k & w_{1,2}^k & \cdots & w_{1,R}^k \\ w_{2,1}^k & w_{2,2}^k & \cdots & w_{2,R}^k \\ \vdots & \vdots & \ddots & \vdots \\ w_{N_t,1}^k & w_{N_t,2}^k & \cdots & w_{N_t,R}^k \end{pmatrix} \quad \text{[Equation 26]}$$

$$= (U_{N_t \times R}^k)$$

$$\begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_R k} \end{pmatrix}$$

If the $GPSD_{N_t \times R}^k$ matrix is configured in the form of Equation 26, data symbols of each stream are shifted by the same phase, so that the $GPSD_{N_t \times R}^k$ matrix can be easily configured. If Equation 7 is extended, the $GPSD_{N_t \times R}^k$ matrix can be represented by the following equation 27:

$$GPSD_{N_t \times R}^k = \begin{pmatrix} w_{1,1}^k & w_{1,2}^k & \cdots & w_{1,R}^k \\ w_{2,1}^k & w_{2,2}^k & \cdots & w_{2,R}^k \\ \vdots & \vdots & \ddots & \vdots \\ w_{N_t,1}^k & w_{N_t,2}^k & \cdots & w_{N_t,R}^k \end{pmatrix} \quad \text{[Equation 27]}$$

-continued $$= \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_{N_t} k} \end{pmatrix} (U^k_{N_t \times R})$$

$$\begin{pmatrix} e^{j\theta'_1 k} & 0 & \cdots & 0 \\ 0 & e^{j\theta'_2 k} & \cdots & 0 \\ \vdots & \vdots & \ddots & 0 \\ 0 & 0 & 0 & e^{j\theta'_R k} \end{pmatrix}$$

As can be seen from Equation 27, rows and columns of the $GPSD_{N_t \times R}{}^k$ matrix have independent phase values, so that many more frequency diversity gains can be acquired.

<Generalized Cyclic Delay Diversity Scheme>

Prior to describing this embodiment of the present invention, a generalized cyclic delay diversity (GCDD) scheme acting as an exemplary MIMO scheme will hereinafter be described in detail.

A variety of MIMO schemes have been developed to increase a communication performance in a multi-codeword (MCW)-based MIMO-OFDM system. A representative example of the MIMO scheme is a GCDD scheme used as a layer permutation scheme capable of performing channel normalization between codewords.

The GCDD scheme allows preceding matrix characteristics to be differently established according to individual sub-carriers, so that channel normalization between channels is performed.

Namely, the GCDD scheme controls all streams to be transmitted via all antennas. In this case, it should be noted that the GCDD scheme multiplies sequences having different phase values by the above-mentioned streams to be transmitted, and then transmits the multiplied resultant streams. Mathematical expression of the above-mentioned GCDD scheme may also be written in the same manner as in Equation 24 of the GPSD scheme.

The above-mentioned generalized phase shift diversity (GPSD) scheme and the above-mentioned generalized cyclic delay diversity (GCDD) scheme may also be simultaneously used, as shown in the following equation 28:

[Equation 28]

$$GPSD^k_{N_t \times R} GCDD^k_{R \times R} = \begin{pmatrix} w^k_{1,1} & w^k_{1,2} & \cdots & w^k_{1,R} \\ w^k_{2,1} & w^k_{2,2} & \cdots & w^k_{2,R} \\ \vdots & \vdots & \ddots & \vdots \\ w^k_{N_t,1} & w^k_{N_t,2} & \cdots & w^k_{N_t,R} \end{pmatrix}$$

$$= \underbrace{\begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_{N_t} k} \end{pmatrix}(W^k_{N_t \times R})}_{GPSD^k_{N_t \times R}}$$

$$\underbrace{\begin{pmatrix} e^{j\theta'_1 k} & 0 & \cdots & 0 \\ 0 & e^{j\theta'_2 k} & \cdots & 0 \\ \vdots & \vdots & \ddots & 0 \\ 0 & 0 & 0 & e^{j\theta'_R k} \end{pmatrix} U^k_{R \times R}}_{GCDD^k_{R \times R}}$$

In Equation 28, $W_{N_t \times R}{}^k$ and $U_{R \times R}{}^k$ can be a preceding matrix suitable for a sub-carrier "k" may be used, or can be a preceding matrix fixed for an entire frequency domain may be used.

Figure 6:
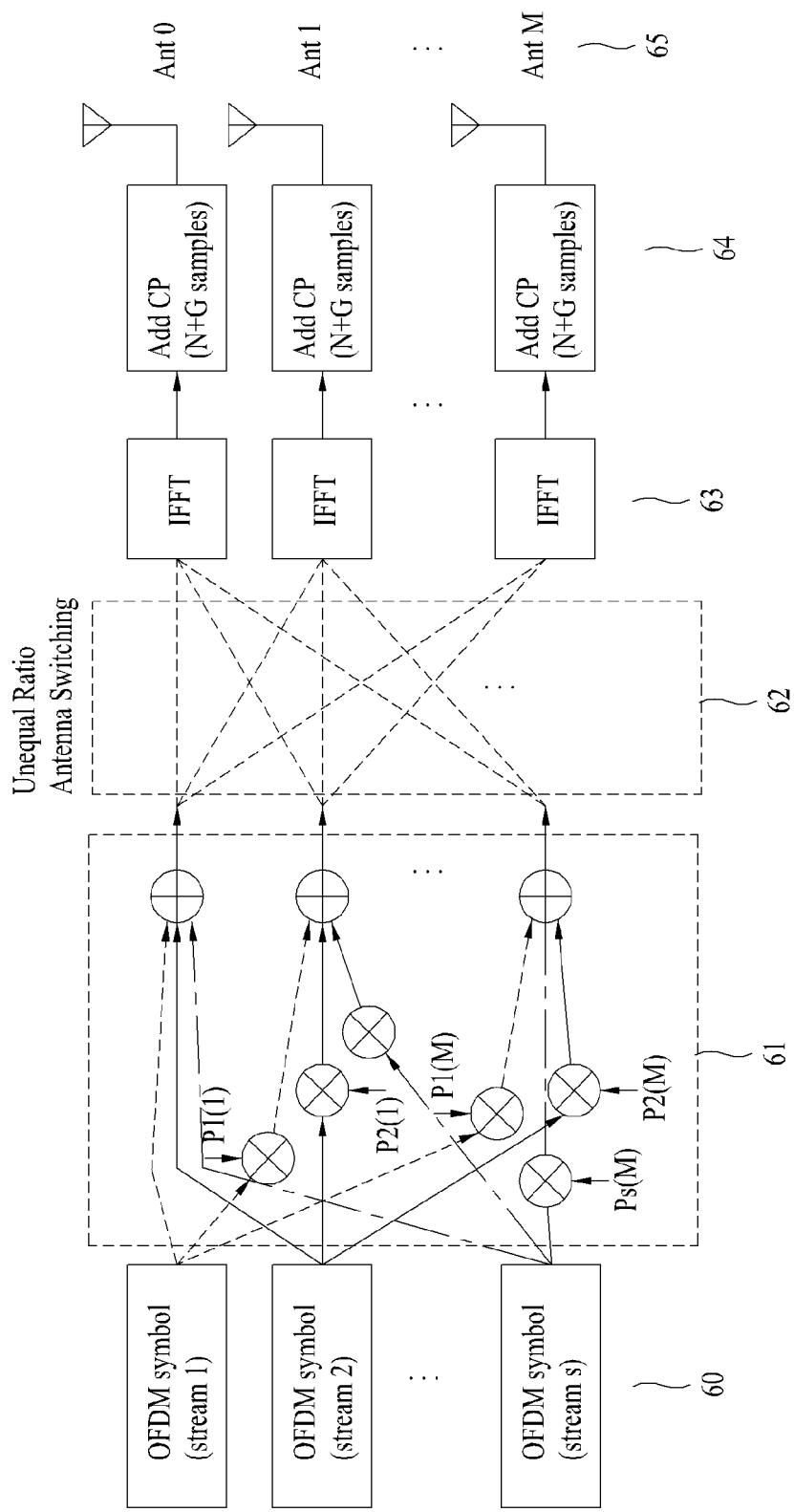
FIG. 6 is a transmission-end's block diagram illustrating an example of a generalized phase-shift diversity scheme available for an OFDM system according to another embodiment of the present invention.

FIG. 6 is a block diagram of transmission-end illustrating an example of a generalized phase-shift diversity scheme available for an OFDM system according to another embodiment of the present invention.

The transmission end of FIG. 6 is similar to that of the generalized phase shift diversity scheme of the OFDM system of FIG. 5. Therefore, the transmission end of FIG. 6 will hereinafter be described on the basis of only characteristic constitutions of the present invention.

Referring to FIG. 6, the transmission end additionally includes an unequal ratio antenna switching unit 62.

If each OFDM symbol 60 enters a GPSD-based spatial processing block 61, the spatial processing block 61 performs spatial processing on the received OFDM symbol 60, so that a signal for each Tx-antenna is configured. And, the spatially-processed signals are transmitted to the unequal ratio antenna switching unit 62, and are then converted into time-domain signals by IFFT modules 63 of individual antennas selected according to the space-time-code unequal ratio transmission scheme. Then, the CP is inserted into each time-domain signal by the CP-adder (also called "Add CP") 64, so that the final resultant signal is transmitted to the reception end via each Tx antenna 65.

As previously stated in FIG. 2, the above-mentioned unequal ratio antenna switching unit 62 transmits the spatially-processed signals to individual Tx antennas, so that it serves as the unequal ratio transmitter. In this case, it should be noted that the spatially-processed signals have been processed at rates suitable for the individual Tx antennas.

In this case, the antenna switching unit 62 based on the antenna switching scheme may be separated from the GPSD-based spatial processing block 61 of FIG. 6. The spatial processing block 61 may also perform the GPSD antenna-switching using the space-time code capable of having the same effect as that of the antenna switching unit 62.

Figure 7:
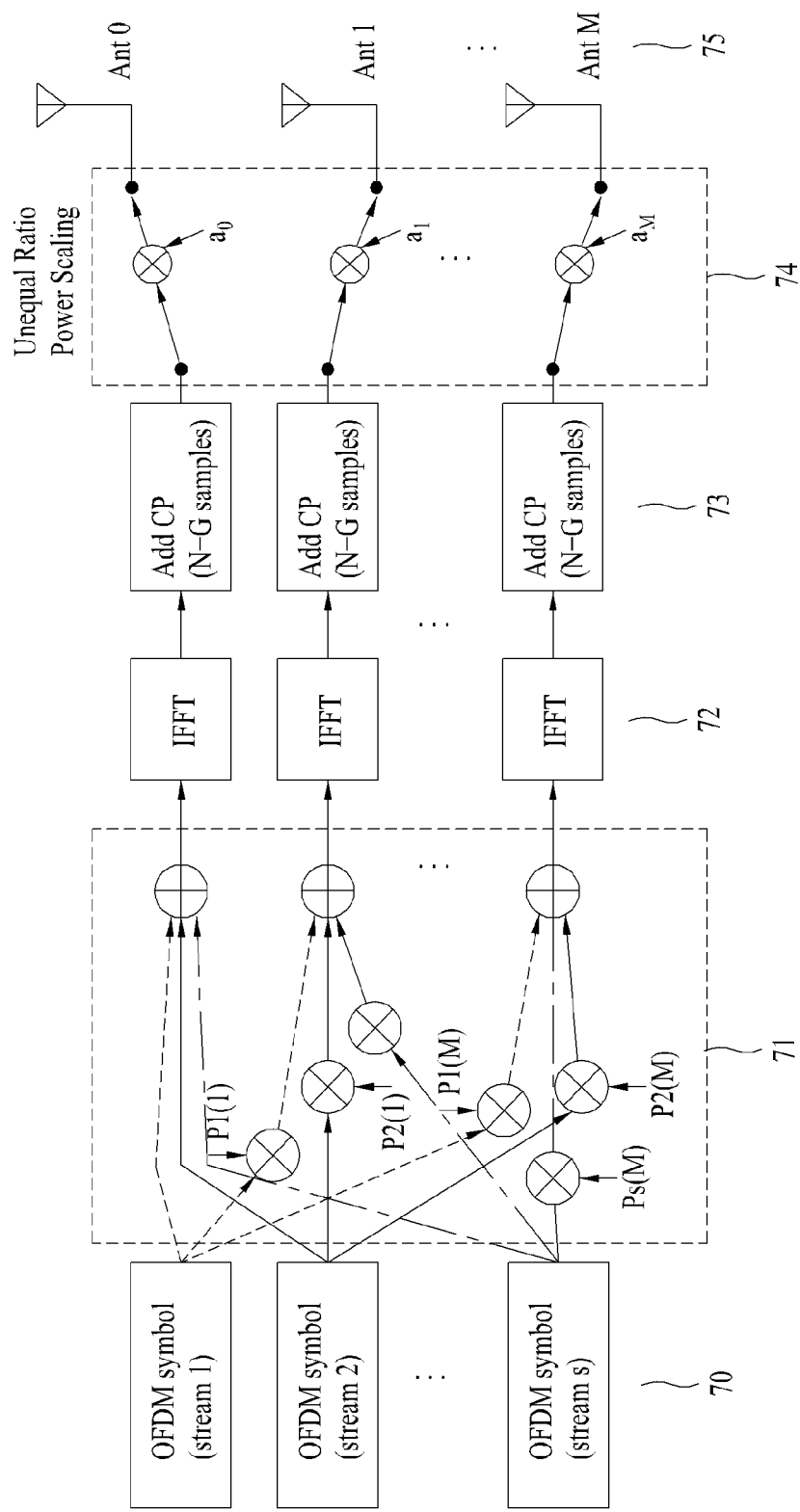
FIG. 7 is a transmission-end's block diagram illustrating an example of a generalized phase-shift diversity scheme available for an OFDM system according to still another embodiment of the present invention.

FIG. 7 is a block diagram of transmission-end illustrating an example of a generalized phase-shift diversity scheme available for an OFDM system according to still another embodiment of the present invention.

The transmission end of FIG. 7 is similar to FIG. 5's transmission end to which the GPSD scheme and the space-time-code unequal ratio transmission scheme are applied. Therefore, the transmission end of FIG. 7 will hereinafter be described on the basis of only characteristic constitutions of the present invention.

The transmission end of FIG. 7 includes the unequal ratio antenna switching unit 71, and includes the unequal ratio power-scaling unit 74.

If each OFDM symbol 70 enters the GPSD-based spatial processing block 71, the spatial processing block 71 performs spatial processing on the received OFDM symbol 70, so that a signal for each Tx-antenna is configured. And, the spatially-processed signals are converted into time-domain signals by the IFFT modules 72 of individual antennas. Then, the CP is inserted into each time-domain signal by the CP-adder (also called "Add CP") 74, so that the final resultant signal is transmitted to the reception end via each Tx antenna 75.

As previously stated in FIG. 3, the above-mentioned unequal ratio power-scaling unit 74 transmits the spatially-processed signals to individual Tx antennas, so that it serves as the unequal ratio transmitter. In this case, it should be noted that the spatially-processed signals have been processed at rates suitable for the individual Tx antennas. For example, if individual Tx antennas have different reliabilities, a low-reliability Tx antenna may be reduced and then transmitted.

Operations of the unequal ratio power-scaling unit 74 will be described in more detail. As can be seen from FIG. 7, the unequal ratio power-scaling unit 74 receives output signals of the spatial processing block 71, and transmits the received signals using a power factor $a_i, i=1, 2, \ldots, N_t$ decided by reliability of each Tx antenna, so that it can adjust a power of each Tx antenna. In this case, it is preferable that the power of reference symbols of all Tx antennas may not be adjusted by the aforementioned power factor so as to prevent the channel estimation performance from being deteriorated.

And, it should be noted that the transmission end of FIG. 7 has been disclosed for only illustrative purposes, the unequal ratio power-scaling unit 74 may be located at the same location as the spatial processing unit, or may be located behind the spatial processing unit. And, the unequal ratio power-scaling unit 72 can also be located at other points placed before data or signals are transmitted via Tx antennas.

In addition, an example of the $GPSD_{N_t \times R}^k$ matrix to which the generalized phase-shift diversity (GPSD) scheme and the unequal ratio transmission scheme can be simultaneously applied is shown in the following equation 29:

$$\begin{bmatrix} a_1 & 0 & \cdots & 0 \\ 0 & a_2 & \cdots & 0 \\ \vdots & \vdots & \ddots & \vdots \\ 0 & 0 & \cdots & a_{N_t} \end{bmatrix} \begin{bmatrix} w_{1,1}^k & w_{1,2}^k & \cdots & w_{1,R}^k \\ w_{2,1}^k & w_{2,2}^k & \cdots & w_{2,R}^k \\ \vdots & \vdots & \ddots & \vdots \\ w_{N_t,1}^k & w_{N_t,2}^k & \cdots & w_{N_t,R}^k \end{bmatrix} \quad [\text{Equation 29}]$$

As can be seen from Equation 29, the power-scaling matrix is multiplied by the $GPSD_{N_t \times R}^k$ matrix, so that the generalized phase-shift diversity (GPSD) scheme and the unequal ratio transmission scheme can be simultaneously applied to the multiplied result.

Provided that a phase angle or a time delay value of the phase shift matrix shown in Equation 29 is set to "0", the following equation 20 is acquired:

$$\begin{bmatrix} a_1 & 0 & \cdots & 0 \\ 0 & a_2 & \cdots & 0 \\ \vdots & \vdots & \ddots & \vdots \\ 0 & 0 & \cdots & a_{N_t} \end{bmatrix} \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_{N_t} k} \end{pmatrix} \quad [\text{Equation 30}]$$

$$U_{N_t \times R}^k = \begin{bmatrix} a_1 & 0 & \cdots & 0 \\ 0 & a_2 & \cdots & 0 \\ \vdots & \vdots & \ddots & \vdots \\ 0 & 0 & \cdots & a_{N_t} \end{bmatrix} U_{N_t \times R}^k$$

In Equation 30, $U_{N_t \times R}^k$ is a preceding matrix.

The above-mentioned method for applying the unequal ratio transmission scheme to the above-mentioned GPSD scheme by switching some parts of antennas or scaling a power of each Tx antenna may be equally or similarly to a first case of using the GCDD scheme and a second case of simultaneously using the GPSD and GCDD schemes.

Also, needless to say, the unequal ratio transmission scheme can also be applied to the above-mentioned generalized phase shift diversity scheme in consideration of both the antenna switching method and the Tx-power scaling method.

Fifth Embodiment

Space-Time Code Combined with Unequal Ratio Transmission Scheme for a System to Which Cyclic Delay Diversity is Applied Prior to describing this embodiment of the present invention, a cyclic delay diversity scheme acting as an exemplary MIMO scheme will hereinafter be described in detail.

Figure 8:
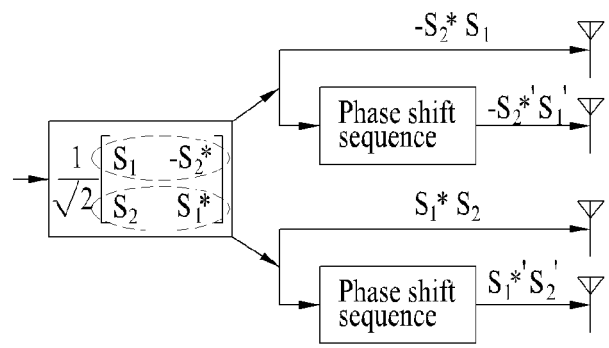
FIG. 8 is a transmission-end's block diagram illustrating an example of a Cyclic Delay Diversity scheme.

FIG. 8 is a block diagram of transmission-end illustrating an example of a Cyclic Delay Diversity scheme according to the present invention.

If a space-time code for 2 Tx antennas is extended to a MIMO system equipped with at least 2 Tx antennas, the cyclic delay diversity (CDD) scheme is applied to the remaining Tx antennas other than the 2 Tx antennas, so that the above space-time code can be extended to the MIMO system.

FIG. 8 shows that the cyclic delay diversity (CDD) scheme is applied to the space-time code (1) of table 1 under the MIMO environment. As shown in FIG. 8, if the space-time code for 2 Tx antennas is extended to the MIMO system equipped with at least 2 Tx antennas, and the phase-shift sequence is applied to the remaining Tx antennas other than the 2 Tx antennas, the above-mentioned cyclic delay diversity (CDD) effect can be acquired. The cyclic delay diversity (CDD) scheme of FIG. 8 can be mathematically represented by the following equation 31.

$$\frac{1}{\sqrt{4}} \begin{bmatrix} 1 & 0 & 0 & 0 \\ 0 & e^{j\theta_1 k} & 0 & 0 \\ 0 & 0 & 1 & 0 \\ 0 & 0 & 0 & e^{j\theta_2 k} \end{bmatrix} \begin{bmatrix} s_1 & -s_2^* \\ s_1 & -s_2^* \\ s_2 & s_1^* \\ s_2 & s_1^* \end{bmatrix} \quad [\text{Equation 31}]$$

Phase Shift Matrix

In Equation 31, $\theta_i, i=1, 2$ which is one of variables of an exponent of value contained in the phase-shift matrix, is indicative of a phase angle corresponding to a phase-shift value or cyclic-delay value. The space-time code (1) of Table 1 is repeated, so that space-time codes of several antennas are generated. In other words, as shown in Equation 31, space-time codes for four antennas are generated, so that the repeated values of Tx codes of the (1,3) Tx-antennas can be transmitted via the (2,4) Tx-antennas, respectively. As described above, if the phase-shift matrix is used, it can be considered that the phase shift of FIG. 8 (i.e., the cyclic delay diversity (CDD) scheme) has been applied.

Figure 9:
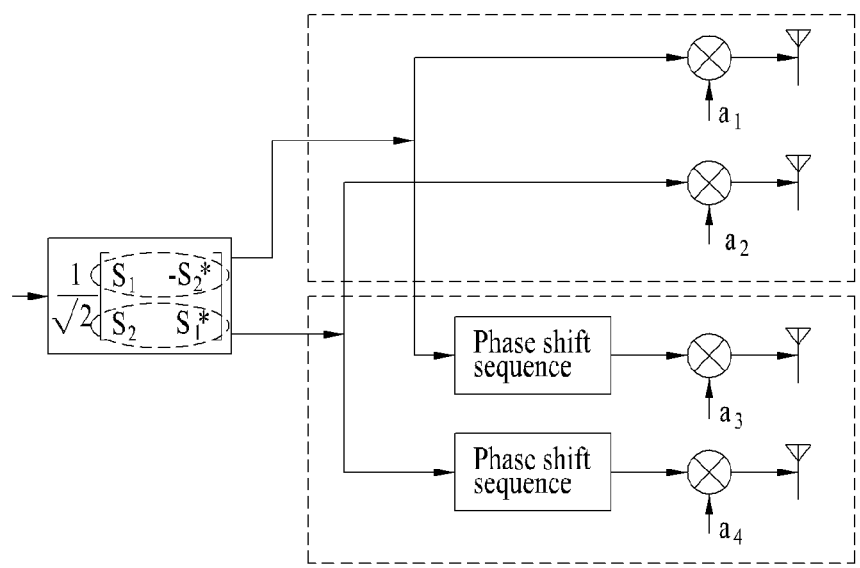
FIG. 9 is a block diagram illustrating a transmission end to which a Cyclic Delay Diversity scheme and an unequal ratio transmission scheme are applied according to the present invention.

FIG. 9 is a block diagram of a transmission end to which a Cyclic Delay Diversity (CDD) scheme and an unequal ratio transmission scheme are applied according to the present invention.

Referring to FIG. 9, a power factor for each Tx antenna is multiplied by each signal to which the cyclic delay diversity (CDD) scheme has been applied, so that a Tx power can be adjusted. Detailed description of the cyclic delay diversity (CDD) scheme is the same as that of FIG. 8. However, according to the CDD scheme of FIG. 9, the repeated value of the Tx codes of the (1,2) Tx-antennas are transmitted via the (3,4) Tx-antennas, respectively, differently from the CDD scheme of FIG. 8.

In this case, the power factor is adjusted, so that a high Tx power is allocated to a high-reliability Tx antenna, and a low Tx power is allocated to a high-reliability Tx antenna. In this way, unequal Tx powers are applied to individual Tx antennas, so that a performance of the receiver increases.

The unequal ratio transmission scheme based on the above-mentioned CDD scheme of FIG. 9 can be mathematically represented by the following equation 32:

$$\frac{1}{\sqrt{4}} \begin{bmatrix} a_1 & 0 & 0 & 0 \\ 0 & a_2 & 0 & 0 \\ 0 & 0 & a_3 e^{j\theta_1 k} & 0 \\ 0 & 0 & 0 & a_4 e^{j\theta_2 k} \end{bmatrix} \begin{bmatrix} S_1 & -S_2^* \\ S_2 & S_1^* \\ S_1 & -S_2^* \\ S_2 & S_1^* \end{bmatrix} \quad \text{[Equation 32]}$$

In Equation 32, $a_i$, i=1, 2, . . . , 4 is a real number, and serves as a power factor for adjusting a power of i-th Tx antenna. For example, if the reliability of the (1,2) Tx-antennas is higher than that of the (3,4) Tx-antennas, the power can be adjusted in the form of the above Equation 15.

Sixth Embodiment

Space-Time Code Combined with Unequal Ratio Transmission Scheme Based on Resource Location Information of Time and Frequency If Tx antennas have different reliabilities, the above-mentioned embodiments have disclosed a variety of methods for increasing the receiving performance of the receiver using different signal-transmission ratios (i.e., unequal transmission ratios) or different signal-power ratios (i.e., unequal power ratios).

However, the reliability of the individual Tx antennas are affected by either a pilot distribution for each Tx antenna or a UE's moving speed. And, the reliability of the Tx antennas may also be changed according to resource location of the time and frequency of the OFDM system. Therefore, a method for differently applying an unequal ratio for each Tx antenna according to resource location of time/frequency will hereinafter be described.

Figure 10:
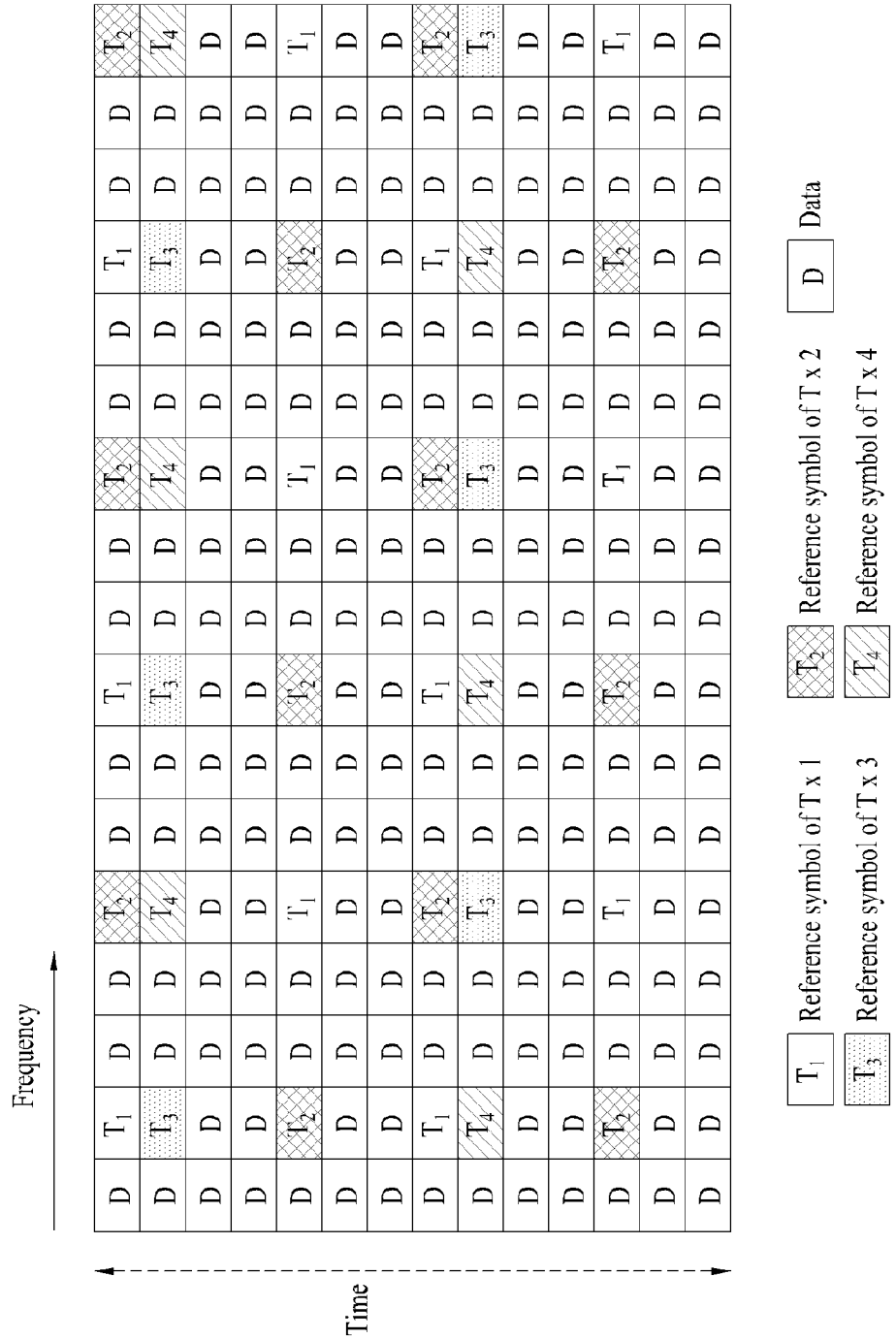
FIG. 10 shows reference symbols of an OFDM system equipped with four Tx antennas.

FIG. 10 shows reference symbols of an OFDM system equipped with four Tx antennas.

Referring to FIG. 10, the multi-path fading occurs under a wireless communication system environment. A channel estimation process is a process for compensating for the signal distortion caused by abrupt environmental variation caused by the fading, so that a Tx signal is recovered. In order to perform channel estimation, a reference symbol mutually recognized between the transmitter and the receiver is used.

In order to increase an amount of Tx data during the mapping of general reference symbols to resource elements, a reference symbol is allocated between sub-carriers for data or control information. In order to facilitate the channel estimation, it is preferable that the power of the reference symbol may be higher than that of data or control information.

For example, in the case of using 4 Tx antennas, if the power of the reference symbol increases by β dB and the reference symbol with the increased power is transmitted, the power of a data sub-carrier must be lowered. In this case, if a codebook is applied to the above-mentioned situation, there arises an unbalanced power among Tx antennas.

For example, provided that the sum of power values contained in a single symbol equipped with individual reference symbols is "1", and a reference symbol increases by 3 dB using the puncturing for 4 antennas, the power of the reference symbols R1 and R2 for the first and second antennas is denoted by 8/12.

In this case, the remaining amount of the power allocated to the data sub-carrier remains is denoted by 4/12, the power of 5/12 is allocated to the first and second antennas, and the power of 1/12 is allocated to the third and fourth antennas, resulting in the occurrence of serious unbalanced power.

As can be seen from FIG. 10, it can be recognized that the number of reference symbols of the (1,2) Tx-antennas is higher than the (3,4) Tx-antennas in a transmission unit. Under the high-speed environment, there is a growing tendency for the (1,2) Tx-antennas to have a higher channel estimation performance as compared to the (3,4) Tx-antennas. However, the OFDM symbol, at which (3,4) reference symbols are located, has difficulty in acquiring a relatively-high channel estimation performance. The above-mentioned reference symbols may also be called other names, (e.g., reference signals (RSs), pilot symbols or pilot signals).

A method for applying an unequal ratio transmission scheme in consideration of time/frequency locations according to the present invention will hereinafter be described in detail. Particularly, the above-mentioned unequal ratio transmission scheme according to the present invention can be more effectively used to solve the physical-antenna unequal power transmission problem caused by the above-mentioned reference symbol.

It does because that there may arise a difference in either channel estimation performance or system performance according to whether reference symbols of which Tx antennas is contained in the OFDM symbol.

According to this embodiment of the present invention, a transmission resource contained in a single transmission unit for example, a sub-frame is divided into one or more resource regions, and a space-time code is differently applied to the one or more resource regions.

In this case, there are a variety of references to discriminate the individual resource regions, for example, a first method in which the number of Tx antennas via which reference symbols is transmitted is different in individual resource regions, a second method in which a reference-symbol transmission regions and a data-symbol-dedicated transmission regions other than the reference symbol may be used as the above references.

Also, a method for differently applying a space-time code to individual regions may also be used as the above-mentioned reference. A variety of methods can be made available, e.g., a first method in which different space-time codes are applied to individual regions according to the number of Tx antennas via which reference symbols are transmitted, a second method in which different space-time codes are applied to individual regions according to a Tx antenna via which a reference symbol is transmitted, and a third method which determines if a reference symbol is transmitted via a corresponding regions, and applies different space-time codes to individual regions according to the determined result.

Figure 11:
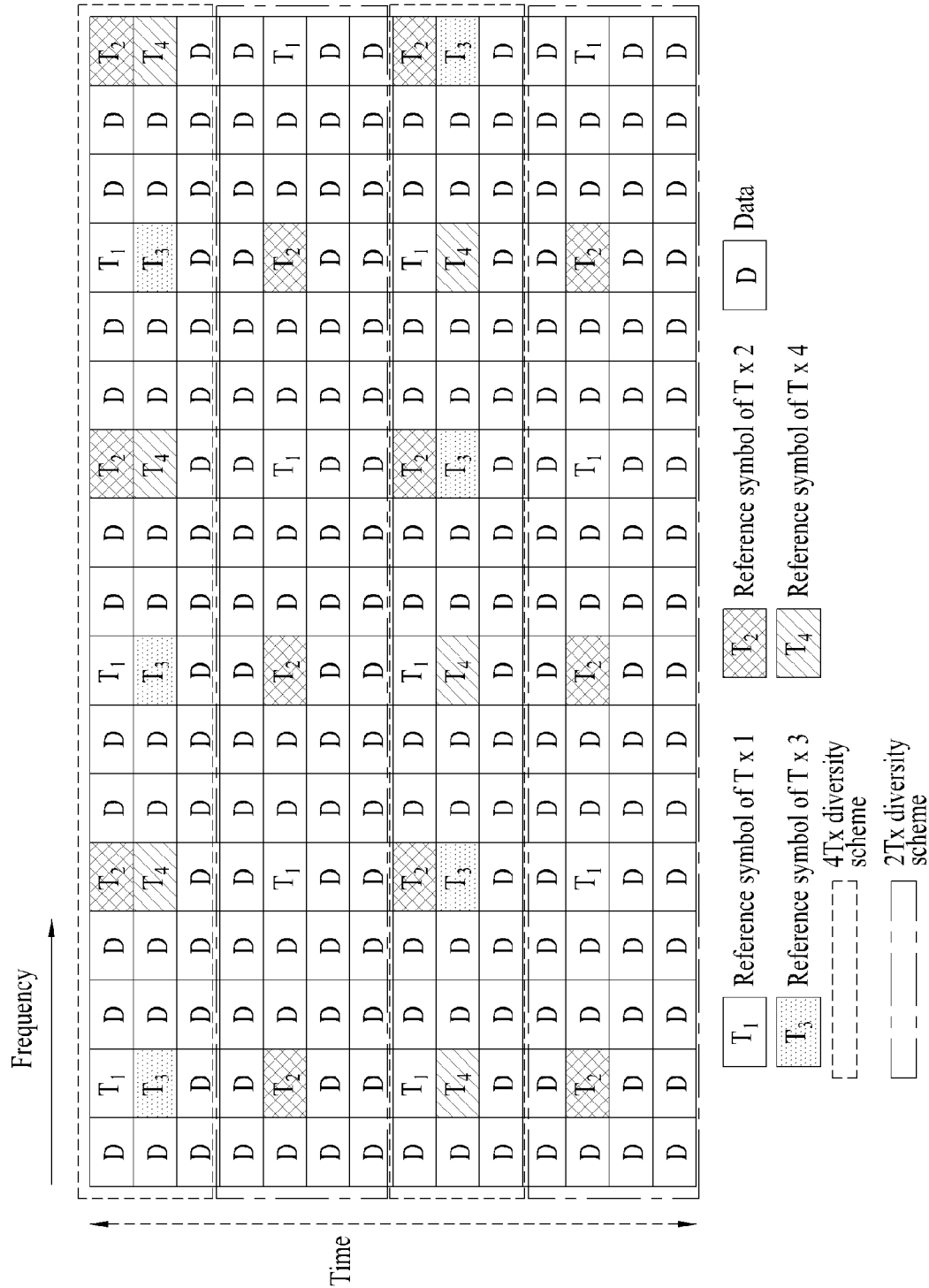
FIG. 11 is a conceptual diagram illustrating an unequal ratio transmission scheme based on time and frequency locations according to a first embodiment of the present invention.

FIG. 11 is a conceptual diagram illustrating an unequal ratio transmission scheme based on time and frequency locations according to a first embodiment of the present invention.

In more detail, FIG. 11 shows an application example of the unequal ratio transmission scheme implemented in consideration of a reference symbol structure of the OFDM system equipped with 4 Tx antennas.

Transmission resources contained in a single transmission unit is divided into one or more resource regions. For example, a first OFDM-symbol region and a second OFDM-symbol region exist in FIG. 11. The first OFDM-symbol region includes all reference symbols for 4 Tx antennas (including (1,2,3,4) Tx-antennas), and the second OFDM-symbol region includes only reference symbols for 2 Tx antennas (including (1,2) Tx-antennas).

As can be seen from FIG. 10, if it the number of reference symbols of the (1,2) Tx-antennas is higher than those of the (3,4) Tx-antennas, under the high-speed environment, there is a growing tendency for the (1,2) Tx-antennas to have a higher channel estimation performance as compared to the (3,4) Tx-antennas. However, the OFDM symbol, at which the (3,4) Tx-antennas' reference symbols are located, has difficulty in acquiring a relatively-high channel estimation performance. Namely, it is expected that there is a difference (i.e., inequality) in performance of individual antennas.

Therefore, the 4Tx diversity scheme is applied to the first OFDM-symbol region including all reference symbols for the (1,2,3,4) Tx-antennas. The 2Tx diversity scheme is applied to the second OFDM-symbol region other than the first OFDM-symbol region. In other words, the diversity scheme, the transmission scheme, or the space-time code is differentially applied to individual regions.

If reference symbols of individual Tx antennas have different amounts, the MIMO scheme mainly suitable for a corresponding Tx antenna is applied to a specific region including many reference symbols of the corresponding Tx antenna. In the case of applying this embodiment, the Rx performance can be improved under the high-speed mobile environment. Needless to say, the scheme of FIG. 11 may also be applied to other reference symbol structures. Generally, if a corresponding MIMO scheme is used in a time-domain where a reference symbol of the Tx antenna is used, the high performance can be acquired under the high-speed mobile environment.

Figure 12:
FIG. 12 is a conceptual diagram illustrating an unequal ratio transmission scheme based on time and frequency locations according to a second embodiment of the present invention.

FIG. 12 is a conceptual diagram illustrating an unequal ratio transmission scheme based on time and frequency locations according to a second embodiment of the present invention. In more detail, FIG. 12 shows an unequal ratio transmission scheme implemented in consideration of the reference symbol structure of the OFDM system equipped with 4 Tx-antennas.

FIG. 12 shows a distinction based on a subcarrier or frequency, whereas FIG. 11 shows a distinction based on the OFDM-symbol. As shown in FIG. 12, an overall frequency bandwidth is divided into at least two division regions on the basis of the frequency. And, the diversity scheme, the transmission scheme, or the space-time code can be differentially determined and applied to individual division regions. In this case, the determined space-time code may be determined in consideration of the reference symbol or data symbol transmitted to each division region.

A method for employing a space-time signal processing scheme suitable for a first region having reference symbols or a second region having no reference symbols will hereinafter be described with reference to FIGS. 13 and 14.

Figure 13:
FIG. 13 is a conceptual diagram illustrating an unequal ratio transmission scheme based on time and frequency locations according to a third embodiment of the present invention.

FIG. 13 is a conceptual diagram illustrating an unequal ratio transmission scheme based on time and frequency locations according to a third embodiment of the present invention. In more detail, FIG. 13 shows an application example of the unequal ratio transmission scheme based on a reference symbol structure of the OFDM system equipped with 4 Tx antennas.

A transmission resource contained in a single transmission unit is divided into one or more resource regions. For example, a first OFDM-symbol region and a second OFDM-symbol region exist in FIG. 13. The first OFDM-symbol region includes all reference symbols for at least one of (1,2,3,4) Tx-antennas, and the second OFDM-symbol region includes only data symbols.

As can be seen from FIG. 13, different transmission schemes or different space-time codes are applied to the above-mentioned first and second OFDM-symbol region. For example, the unequal ratio transmission scheme may be applied to the first OFDM-symbol region including reference symbols, and an equal ratio transmission scheme may be applied to the second OFDM-symbol region including only data symbols.

If the unequal ratio transmission scheme is applied to the first OFDM-symbol region including reference symbols, the unbalance problem in Tx power between individual physical antennas can be solved, resulting in an increased Tx power of each reference symbol.

Figure 14:
FIG. 14 is a conceptual diagram illustrating an unequal ratio transmission scheme based on time and frequency locations according to a fourth embodiment of the present invention.

FIG. 14 is a conceptual diagram illustrating an unequal ratio transmission scheme based on time and frequency locations according to a fourth embodiment of the present invention. In more detail, FIG. 14 shows an application example of the unequal ratio transmission scheme based on a reference symbol structure of the OFDM system equipped with 4 Tx antennas.

A transmission resource contained in a single transmission unit is divided into one or more resource regions. For example, a first subcarrier region and a second subcarrier region exist in FIG. 14. The first subcarrier region includes all reference symbols for at least one of (1,2,3,4) Tx-antennas, and the second subcarrier region includes only data symbols.

In FIG. 14, different transmission schemes or different space-time codes are applied to the above-mentioned first and second subcarrier region. For example, the unequal ratio transmission scheme may be applied to the first subcarrier region including reference symbols, and an equal ratio transmission scheme may be applied to the second subcarrier region including only data symbols.

If the unequal ratio transmission scheme is applied to the first OFDM-symbol time-domain including reference symbols, the unbalance problem in Tx power between individual physical antennas can be solved, resulting in an increased Tx power of each reference symbol.

Figure 15:
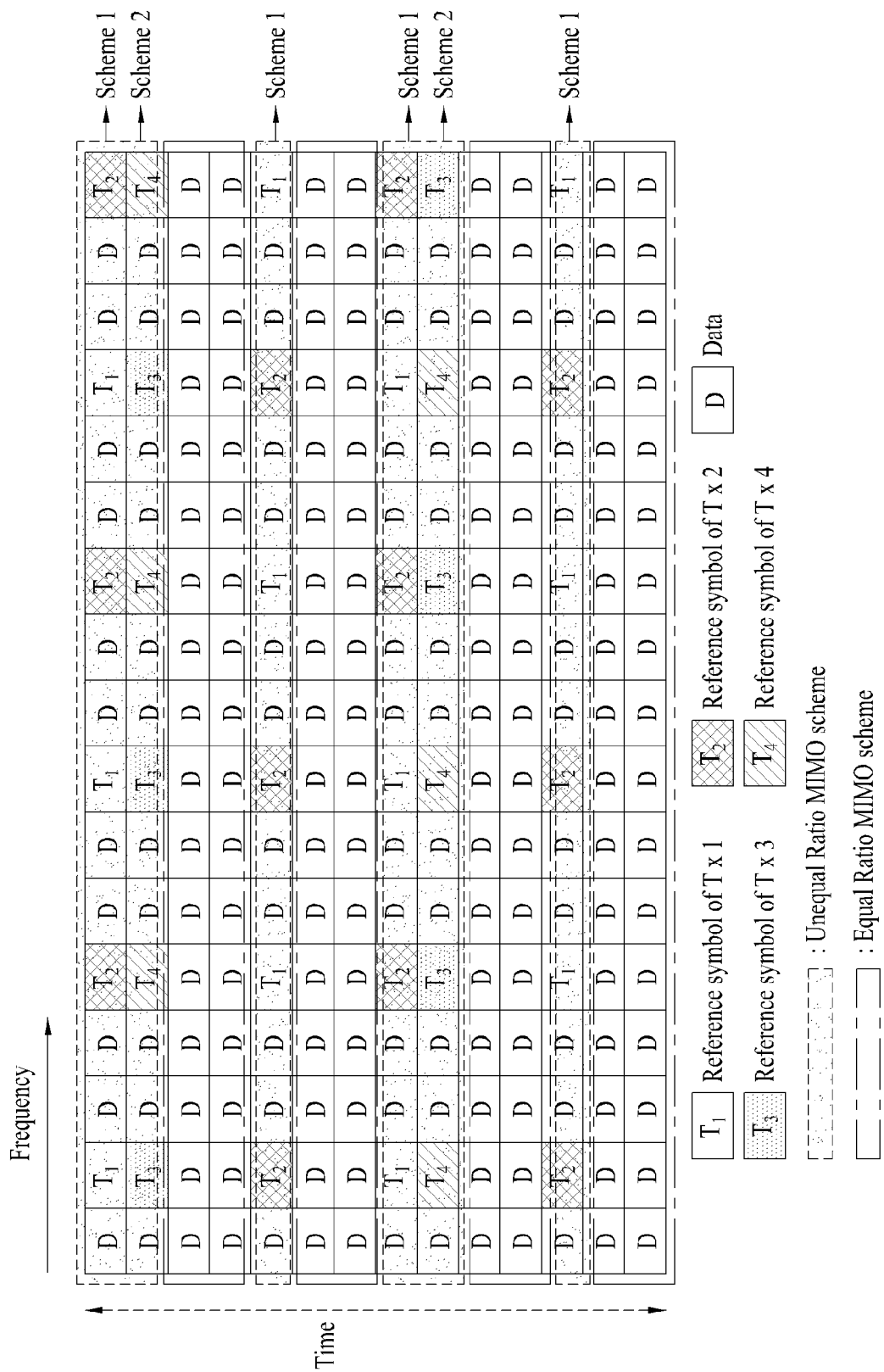
FIG. 15 is a conceptual diagram illustrating an unequal ratio transmission scheme based on time and frequency locations according to a fifth embodiment of the present invention.

FIG. 15 is a conceptual diagram illustrating an unequal ratio transmission scheme based on time and frequency locations according to a fifth embodiment of the present invention.

In more detail, according to the concept of FIG. 15, different-type unequal signal transmission schemes are applied to individual OFDM symbol region or individual sub-carrier region within the range of the unequal ratio transmission scheme.

For example, the OFDM symbol associated with the reference symbols of FIG. 13 has used the unequal ratio transmission scheme. In the case of FIG. 13, different-type signal transmission schemes may be used according to antenna number types of reference symbols contained in each OFDM symbol.

In the case of the OFDM-symbol region shown in FIG. 15, i.e., the OFDM-symbol region to which the unequal ratio transmission scheme is applied, it should be noted that one or more transmission schemes may be applied to the above-mentioned OFDM-symbol region. In other words, a first OFDM-symbol region and a second OFDM-symbol region exist in FIG. 15. The first OFDM-symbol region transmits reference symbols for (1,2) Tx-antennas, and the second OFDM-symbol region transmits reference symbols for (3,4) Tx-antennas.

In FIG. 15, two kinds of unequal ratio transmission schemes are used, i.e., a first unequal ratio transmission scheme (Scheme 1) and a second unequal ratio transmission scheme (Scheme 2). The first unequal ratio transmission scheme (Scheme 1) is used at an OFDM symbol where reference symbols for (1,2) Tx-antennas have been used, and is designed to transmit many more signals to (3,4) Tx-antennas than the (1,2) Tx-antennas in order to improve the power of a reference symbol. The second unequal ratio transmission scheme (Scheme 2) may be based on a space-time-code signal transmission scheme, which is capable of transmitting signals in the direction from an OFDM symbol, where reference symbols for the (3,4) Tx-antennas have been used, to the (1,2) Tx-antennas.

A method for employing the antenna switching scheme using the following equations 33 to 36 will hereinafter be described in detail.

$$\text{Antenna} \left\| \begin{bmatrix} 0 & 0 & 0 & 0 & 0 & 0 & S_7 & -S_8^* \\ 0 & 0 & 0 & 0 & 0 & 0 & S_8 & S_7^* \\ S_1 & -S_2^* & S_3 & -S_4^* & S_5 & -S_6^* & 0 & 0 \\ S_2 & S_1^* & S_4 & S_3^* & S_6 & S_5^* & 0 & 0 \end{bmatrix} \right. \overbrace{\phantom{XXXXXXXXXXXXXXX}}^{\text{Frequency}} \quad [\text{Equation 33}]$$

$$\text{Antenna} \left\| \begin{bmatrix} 0 & 0 & 0 & 0 & S_5 & S_6 & 0 & 0 \\ 0 & 0 & 0 & 0 & 0 & 0 & S_7 & S_8 \\ S_1 & S_2 & S_3 & S_4 & -S_6^* & S_5^* & 0 & 0 \\ -S_2^* & S_1^* & -S_4^* & S_3^* & 0 & 0 & -S_8^* & S_7^* \end{bmatrix} \right. \overbrace{\phantom{XXXXXXXXXXXXXXX}}^{\text{Frequency}} \quad [\text{Equation 34}]$$

Equations 33 and 34 show examples of space-time codes of the first unequal ratio transmission scheme (Scheme 1). In more detail, Equations 33 and 34 show the space-time code signal transmission scheme, which is designed to transmit more signals to the (3,4) Tx-antennas, thereby increasing the power of reference symbol. Preferably, the above-mentioned space-time code may be used at the OFDM symbol where reference symbols for the (1,2) Tx-antennas have been used.

$$\text{Antenna} \left\| \begin{bmatrix} S_1 & -S_2^* & S_3 & -S_4^* & S_5 & -S_6^* & 0 & 0 \\ S_2 & S_1^* & S_4 & S_3^* & S_6 & S_5^* & 0 & 0 \\ 0 & 0 & 0 & 0 & 0 & 0 & S_7 & -S_8^* \\ 0 & 0 & 0 & 0 & 0 & 0 & S_8 & S_7^* \end{bmatrix} \right. \overbrace{\phantom{XXXXXXXXXXXXXXX}}^{\text{Frequency}} \quad [\text{Equation 35}]$$

$$\text{Antenna} \left\| \begin{bmatrix} S_1 & S_2 & S_3 & S_4 & S_5 & S_6 & 0 & 0 \\ -S_2^* & S_1^* & -S_4^* & S_3^* & 0 & 0 & S_7 & S_8 \\ 0 & 0 & 0 & 0 & -S_6^* & S_5^* & 0 & 0 \\ 0 & 0 & 0 & 0 & 0 & 0 & -S_8^* & S_7^* \end{bmatrix} \right. \overbrace{\phantom{XXXXXXXXXXXXXXX}}^{\text{Frequency}} \quad [\text{Equation 36}]$$

Equations 35 and 36 show examples of space-time codes of the second unequal ratio transmission scheme (Scheme 2). In more detail, Equations 35 and 36 show the space-time code signal transmission scheme, which is designed to transmit more signals to the (1,2) Tx-antennas, thereby increasing the power of reference symbol. Preferably, the above-mentioned space-time code may be used at the OFDM symbol where reference symbols for the (3,4) Tx-antennas have been used.

The ratio of the unequal ratio transmission schemes of Equations 33~36 can also be modified into others, and all the conventional schemes may also be applied to the space-time codes.

The following equations 37~40 show the power-scaling application examples.

$$\text{Antenna} \left\| \begin{bmatrix} a_1 & 0 & 0 & 0 \\ 0 & a_2 & 0 & 0 \\ 0 & 0 & a_3 & 0 \\ 0 & 0 & 0 & a_4 \end{bmatrix} \begin{bmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix} \right. \overbrace{\phantom{XXXXXXXXXXX}}^{\text{Time or Subcarrier}} \quad [\text{Equation 37}]$$

$$\text{Antenna} \left\| \begin{bmatrix} a_1 & 0 & \cdots & 0 \\ 0 & a_2 & \cdots & 0 \\ \vdots & \vdots & \ddots & \vdots \\ 0 & 0 & \cdots & a_{N_t} \end{bmatrix} \underbrace{\begin{bmatrix} w_{1,1}^k & w_{1,2}^k & \cdots & w_{1,R}^k \\ w_{2,1}^k & w_{2,2}^k & \cdots & w_{2,R}^k \\ \vdots & \vdots & \ddots & \vdots \\ w_{N_t,1}^k & w_{N_t,2}^k & \cdots & w_{N_t,R}^k \end{bmatrix}}_{GPSD_{N_t \times R}^k \text{ or } GCDD_{R \times R}^k} \right. \overbrace{\phantom{XXXXXXXXXXX}}^{\text{Time or Subcarrier}} \quad [\text{Equation 38}]$$

In Equations 37 and 38, the power-scaling matrix, which satisfies a predetermined condition $(|a_1|^2=|a_2|^2) \leq (|a_3|^2=|a_4|^2)$, $|a_1|^2+|a_2|^2+|a_3|^2+|a_4|^2=K$, can be used.

Equations 37 and 38 show exemplary space-time codes for the first unequal ratio transmission scheme (Scheme 1). In more detail, Equations 37 and 38 show the space-time code signal transmission scheme, which is designed to transmit more power to the (3,4) Tx-antennas, thereby increasing the power of reference symbol. Preferably, the above-mentioned space-time code may be used at the OFDM symbol where reference symbols for the (1,2) Tx-antennas have been used.

$$\text{Antenna} \left\| \begin{bmatrix} a_1 & 0 & 0 & 0 \\ 0 & a_2 & 0 & 0 \\ 0 & 0 & a_3 & 0 \\ 0 & 0 & 0 & a_4 \end{bmatrix} \begin{bmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix} \right. \overbrace{\phantom{XXXXXXXXXXX}}^{\text{Time or Subcarrier}} \quad [\text{Equation 39}]$$

$$\text{Antenna} \left\| \begin{bmatrix} a_1 & 0 & \cdots & 0 \\ 0 & a_2 & \cdots & 0 \\ \vdots & \vdots & \ddots & \vdots \\ 0 & 0 & \cdots & a_{N_t} \end{bmatrix} \underbrace{\begin{bmatrix} w_{1,1}^k & w_{1,2}^k & \cdots & w_{1,R}^k \\ w_{2,1}^k & w_{2,2}^k & \cdots & w_{2,R}^k \\ \vdots & \vdots & \ddots & \vdots \\ w_{N_t,1}^k & w_{N_t,2}^k & \cdots & w_{N_t,R}^k \end{bmatrix}}_{GPSD_{N_t \times R}^k \text{ or } GCDD_{R \times R}^k} \right. \overbrace{\phantom{XXXXXXXXXXX}}^{\text{Time or Subcarrier}} \quad [\text{Equation 40}]$$

In Equations 39 and 40, the power-scaling matrix, which satisfies a predetermined condition $(|a_1|^2=|a_2|^2) \leq (|a_3|^2=a_4|^2)$, $|a_1|^2+|a_2|^2+|a_3|^2+|a_4|^2=K$, can be used.

Equations 39 and 40 show exemplary space-time codes for the second unequal ratio transmission scheme (Scheme 2). In more detail, Equations 39 and 40 show the space-time code signal transmission scheme, which is designed to transmit more power to the (1,2) Tx-antennas, thereby increasing the power of reference symbol. Preferably, the above-mentioned space-time code may be used at the OFDM symbol where reference symbols for the (3,4) Tx-antennas have been used.

In Equation 38 or 40, a phase angle of the phase shift matrix may include the value of "0", and the power-scaling factor $a_i, i=1, \ldots, N_t$ may be used in different ways according to a MIMO scheme. $U_{N_t \times R}^k$ may be a unitary matrix specified for the index k, or may also be fixed irrespective of the index k. The power-scaling value of the power-scaling matrix may be used in different ways according to OFDM symbol (or time resource) locations, or may also be used in different ways according to a power value of a reference symbol.

And, as shown in FIG. 15, the first unequal ratio transmission scheme (Scheme 1) and the second unequal ratio transmission scheme (Scheme 2) can be fixedly used, and at the same time the MIMO scheme suitable for individual user situations can be adaptively used for the OFDM symbol having no reference symbols.

The unequal ratio transmission scheme of FIGS. 12~15 can also be available for other reference structures. Generally, if a corresponding MIMO scheme is used in a time region where reference symbols of the Tx antennas are used, a high performance can be acquired under a high-speed mobile environment.

The above-mentioned schemes of Equations 37 to 40 can also be used in other frequency regions at the same time. In this case, the power-scaling factor values of the power-scaling matrixes of the above-mentioned schemes can be used in different ways. Detailed description thereof will hereinafter be described.

Figure 16:
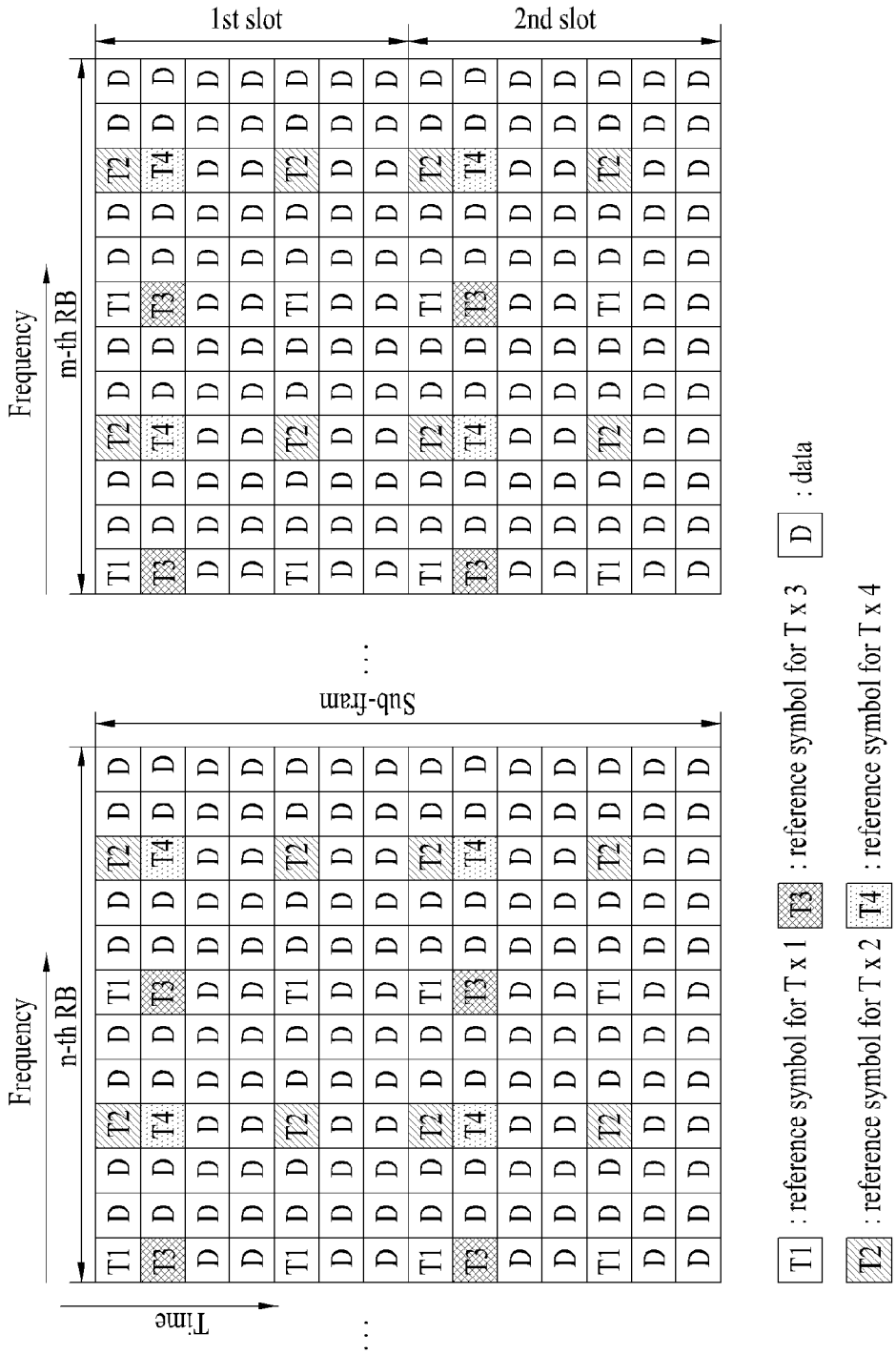
FIG. 16 shows a pilot structure for four Tx antennas of 3GPP LTE system.

FIG. 16 shows a reference structure for four Tx antennas of 3GPP LTE system.

Referring to FIG. 16, a time-resource unit may be considered to be an OFDM symbol, a frequency-resource unit may be considered to be a sub-carrier. As can be seen from FIG. 16, a basic resource unit (i.e., resource block RB) includes 12 sub-carriers.

In this case, although the OFDM symbol includes the reference symbols, the reference symbols are not reference symbols of all Tx antennas but reference symbols of some Tx antennas. For example, the above-mentioned reference symbols contained in the OFDM symbol may be equal to reference symbols of the (1,2) Tx-antennas or the (3,4) Tx-antennas. Therefore, according to the OFDM symbol including reference symbols, the unequal ratio transmission scheme is applied to a sub-carrier for data transmission, such that it is preferable that Tx powers of individual antennas be identical with each other.

In this case, it should be noted that different unequal ratio transmission schemes may also be applied to individual resource blocks. For example, in the case of using the unequal ratio transmission scheme based on the power-scaling scheme, different power-scaling factors of individual resource blocks may be determined and used.

Figure 17:
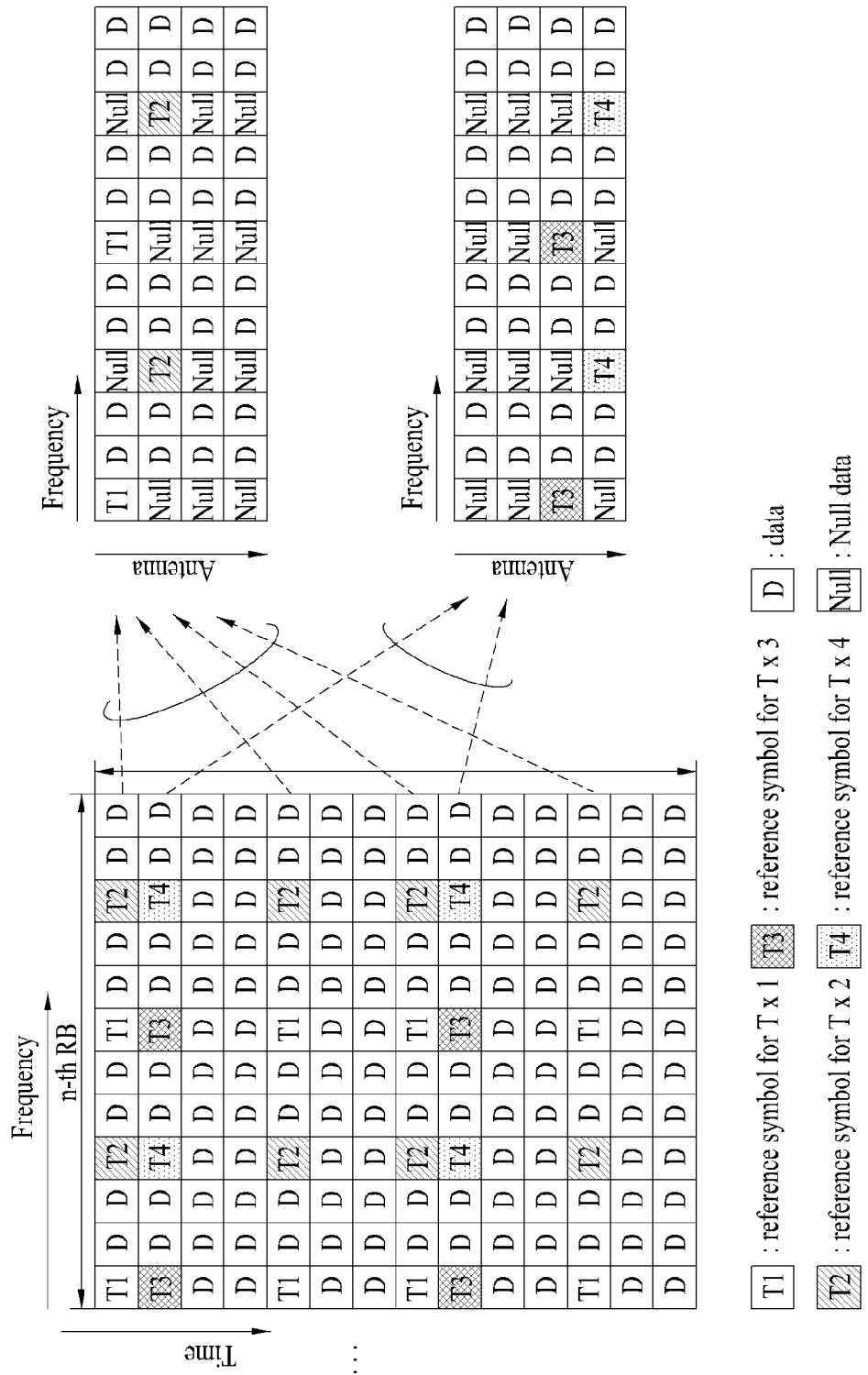
FIG. 17 is a conceptual diagram illustrating a signal mapping scheme for each Tx antenna in association with a single OFDM symbol including a reference symbol according to the present invention.

FIG. 17 is a conceptual diagram illustrating a signal mapping scheme for each Tx antenna in association with a single OFDM symbol including a reference symbol.

A right upper part of FIG. 17 shows signal mapping schemes of individual Tx antennas of a first OFDM symbol which includes reference symbols for (1,2) Tx-antennas at n-th RB (resource block). A right lower part of FIG. 17 shows signal mapping schemes of individual Tx antennas of a second OFDM symbol which includes reference symbols for (3,4) Tx-antennas at n-th RB.

Figure 18:
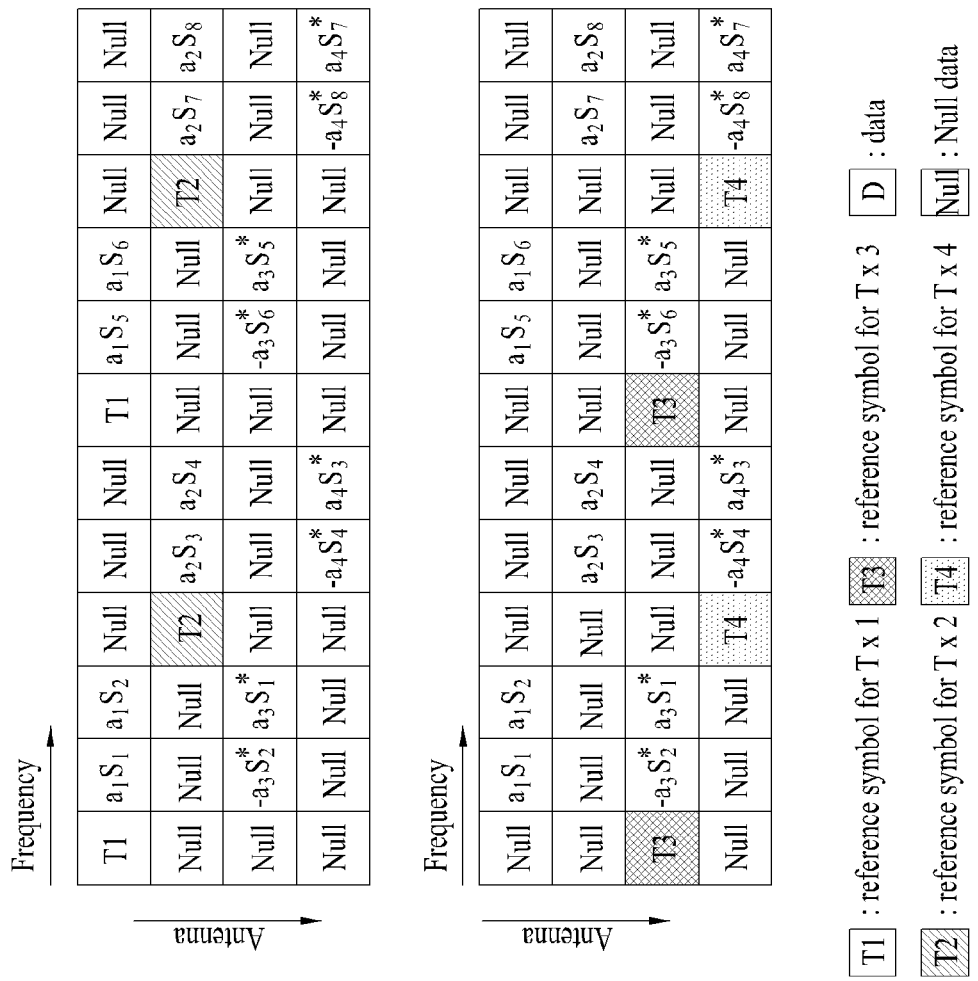
FIG. 18 is a conceptual diagram illustrating an unequal ratio transmission scheme based on a power-scaling scheme in association with a single OFDM symbol equipped with the reference symbol of FIG. 17 according to the present invention.

FIG. 18 is a conceptual diagram illustrating an unequal ratio transmission scheme based on a power-scaling scheme in association with a single OFDM symbol equipped with the reference symbol of FIG. 17 according to the present invention.

In more detail, FIG. 18 shows different signal mapping schemes of individual Tx antennas when any one of the embodiments of Equations 37~39 is used as the power-scaling method.

FIG. 18 shows differential signal mapping methods of individual Tx antennas when any one of the embodiments of Equations 37~39 is used as the power-scaling method.

In FIG. 18, provided that the power of each reference symbol is "$4a$", the OFDM symbol including reference symbols of the (1,2) Tx-antennas uses the power-scaling matrix of Equation 37. In this case, the power-scaling factor can be represented by the following equation 41:

$$|a_1|^2=|a_2|^2=a,\ |a_3|^2=|a_4|^2=3a,\ |a_1|^2+|a_3|^2=|a_2|^2+|a_4|^2=4a \quad \text{[Equation 41]}$$

And, provided that the power of each reference symbol is "$4a$", the other OFDM symbol including reference symbols of the (3,4) Tx-antennas uses the power-scaling matrix of Equation 39. In this case, the power-scaling factor can be represented by the following equation 42:

$$|a_1|^2=|a_2|^2=3a,\ |a_3|^2=|a_4|^2=a,\ |a_1|^2+|a_3|^2=|a_2|^2=|a_2|^2+|a_4|^2=4a \quad \text{[Equation 42]}$$

Namely, if the signal mapping of FIG. 18 is conducted in consideration of the above equations 37 and 41, and equations 39 and 42, Tx powers of individual Tx antennas are set to the same value "$12a$" within a single RB, and the Tx energy of each sub-carrier may have a specific value "$4a$".

In other words, Tx powers of individual Tx antennas are set to a single value so that the same Tx power is used, the power of reference symbol can be increased or decreased within a predetermined range capable of satisfying the above-mentioned relationship, and the ratio of the power-scaling factor may also be changed according to the power of reference symbol.

For another example, in order to increase the power of reference symbol, sub-carrier of specific data may be punctured. In this case, it should be noted that the unequal ratio transmission scheme based on the power-scaling scheme may be used to increase the power of reference symbol.

Figure 19:
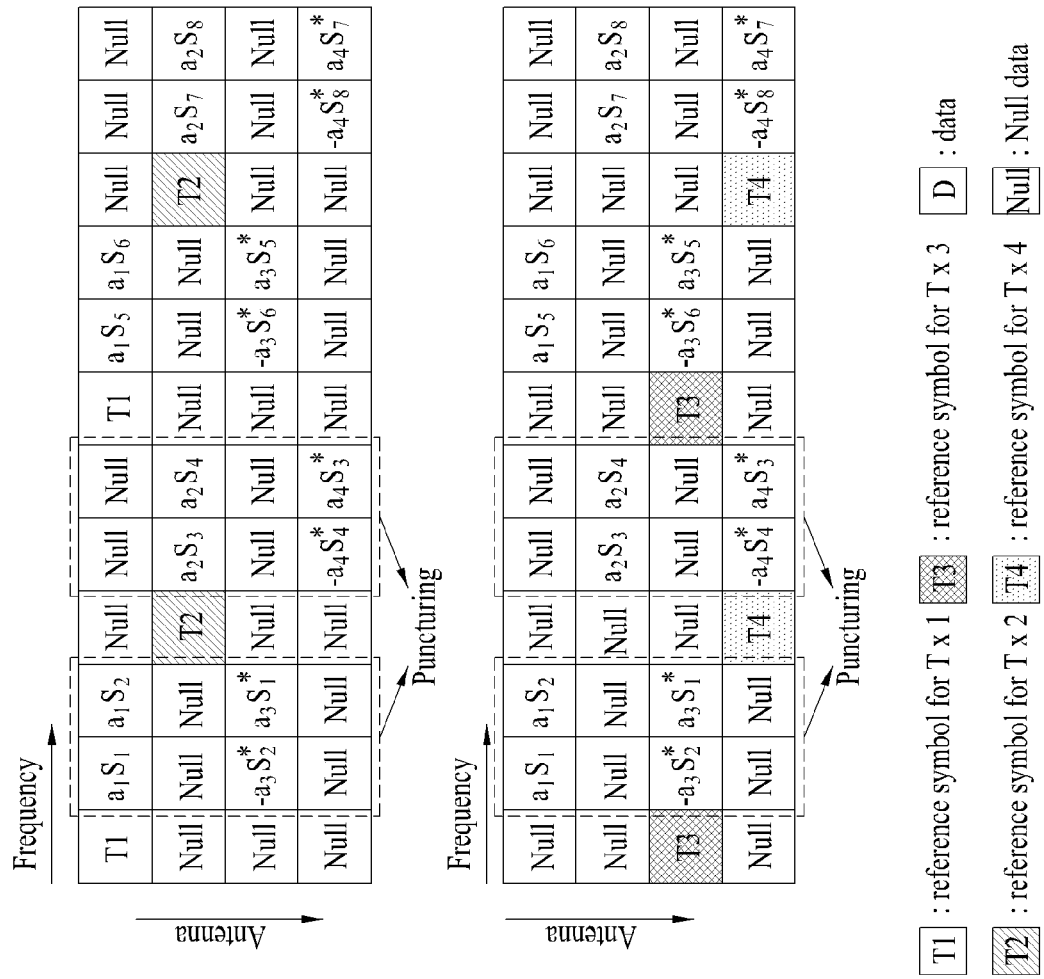
FIG. 19 is a conceptual diagram illustrating an unequal ratio transmission scheme based on a power-scaling scheme if some data is punctured to increase an allocation power of the reference symbol according to the present invention.

FIG. 19 is a conceptual diagram illustrating an unequal ratio transmission scheme based on a power-scaling scheme if some data is punctured to increase an allocation power of the reference symbol according to the present invention.

FIG. 19 shows the puncturing example of some data's subcarriers to increase the Tx power allocated to the reference symbol. Namely, as can be seen from FIG. 19, data located at a second sub-carrier, data located at a third sub-carrier, data located at a fifth sub-carrier, and data located at a sixth sub-carrier are punctured. Needless to say, the above-mentioned description and locations have been disclosed for only illustrative purposes, the locations and the puncturing numbers may be changed to others as necessary.

In this case, if the power-scaling value is determined by the above equations 41 and 42, two data units, each of which is allocated the "$a$"-sized power, are punctured, so that the power of reference symbol increases by "$2a$".

However, in the case of increasing the power of reference symbol using the above-mentioned puncturing, the ratio of the power-scaling factor may be changed, and Tx energy for each data sub-carrier may also be changed. Therefore, the present invention provides a method for differently applying the power-scaling-factor ratios of a first Tx antenna having reference symbols and a second Tx antenna having no reference symbols. In this case, the power-scaling-factor ratios may be set to various values. Preferably, as compared with the other case having no puncturing, the above-mentioned puncturing case may have a higher power-scaling-factor ratio.

Although the above-mentioned embodiments have disclosed the frequency hopping scheme available for uplink data packet transmission, it should be noted that the present invention can also be applied to downlink data packet transmission.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, the present invention provides an unequal ratio transmission scheme of space-time codes. Although multiple antennas have different reliabilities, the unequal ratio transmission scheme can increase the Rx performance irrespective of a UE's moving speed. And, the unequal ratio transmission scheme can solve the physical-antenna unequal power transmission problem caused by reference symbols.

The present invention can be applied to a variety of systems, e.g., a mobile communication system, a multi-carrier system, a MIMO system, a MIMO and multi-carrier system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for transmitting one or more signals in a Multiple-Input Multiple-Output (MIMO) system including four antennas arranged as a first antenna set and a second antenna set, the method comprising:
    mapping data bits to data symbols;
    converting the data symbols into space-time signals; and
    transmitting reference signals and the space-time signals via the four antennas,
    wherein a number of the space-time signals transmitted at a specific orthogonal frequency divisional multiplexing (OFDM) symbol region in a subframe from the first antenna set is twice a number of the space-time signals transmitted at the specific OFDM symbol region in the subframe from the second antenna set,
    wherein the first antenna set and the second antenna set transmit the same number of the reference signals at the specific OFDM symbol region,
    wherein the specific OFDM symbol region is configured with 3 OFDM symbols from a first OFDM symbol of the subframe,
    wherein the first antenna set has two antennas of the four antennas and the second antenna set has the other two of the four antennas, and
    wherein the space-time signals are alternately transmitted through the first antenna set and the second antenna set in the specific OFDM symbol region of the subframe.

2. The method according to claim 1, wherein the space-time signals are transmitted according to a predefined pattern.

3. The method according to claim 2, wherein the data symbols are converted into the space-time signals by using a pre-coding matrix.

4. The method according to claim 3, wherein the pre-coding matrix includes at least a Time-Switched Transmit Diversity (TSTD) scheme or a Frequency-Switched Transmit Diversity (FSTD) scheme.

5. The method according to claim 3 wherein the first antenna set has higher reliability than the second antenna set.

6. A transmission end for transmitting one or more signals in a Multiple-Input Multiple-Output (MIMO) system including four antennas arranged as a first antenna set and a second antenna set, the transmission end comprising:
    a mapper configured to map data bits to data symbols;
    a spatial processing block configured to convert the data symbols into space-time signals; and
    a transmitter configured to transmit reference signals and the space-time signals via the four antennas,
    wherein a number of the space-time signals transmitted at a specific orthogonal frequency divisional multiplexing (OFDM) symbol region in a subframe from the first antenna set is twice a number of the space-time signals transmitted at the specific OFDM symbol region in the subframe from the second antenna set,
    wherein the first antenna set and the second antenna set transmit the same number of the reference signals at the specific OFDM symbol region,
    wherein the specific OFDM symbol region is configured with 3 OFDM symbols from a first OFDM symbol of the subframe,
    wherein the first antenna set has two antennas of the four antennas and the second antenna set has the other two of the four antennas, and
    wherein the space-time signals are alternately transmitted through the first antenna set and the second antenna set in the specific OFDM symbol region of the subframe.

7. The transmission end according to claim 6, wherein the space-time signals are transmitted according to a predefined pattern.

8. The transmission end according to claim 7, wherein the spatial processing block is further configured to convert the data symbols into the space-time signals by using a pre-coding matrix.

9. The transmission end according to claim 8, wherein the pre-coding matrix includes at least a Time-Switched Transmit Diversity (TSTD) scheme or a Frequency-Switched Transmit Diversity (FSTD) scheme.

10. The transmission end according to claim 8, wherein the first antenna set has higher reliability than the second antenna set.

* * * * *